(12) United States Patent
Yamashirodani et al.

(10) Patent No.: US 8,453,017 B2
(45) Date of Patent: May 28, 2013

(54) ELECTRONIC DEVICE SAVING SELECTED ERROR INFORMATION AND AN ERROR MANAGEMENT SYSTEM INCLUDING SUCH A DEVICE

(75) Inventors: Masayuki Yamashirodani, Osaka (JP); Tatsuo Noda, Nishinomiya (JP); Tetsuya Matsuzaka, Osaka (JP); Takeshi Hamakawa, Kusatsu (JP); Akihiko Ikazaki, Osaka (JP); Toshihide Higashimori, Osaka (JP)

(73) Assignee: Kyocera Document Solutions Inc. (JP)

( * ) Notice: Subject to any disclaimer, the term of this patent is extended or adjusted under 35 U.S.C. 154(b) by 144 days.

(21) Appl. No.: 12/547,833

(22) Filed: Aug. 26, 2009

(65) Prior Publication Data
US 2010/0058123 A1    Mar. 4, 2010

(30) Foreign Application Priority Data

| Aug. 27, 2008 | (JP) | 2008-218268 |
| Aug. 27, 2008 | (JP) | 2008-218269 |
| Aug. 28, 2008 | (JP) | 2008-220134 |
| Oct. 7, 2008 | (JP) | 2008-260907 |
| Oct. 7, 2008 | (JP) | 2008-260908 |
| Nov. 20, 2008 | (JP) | 2008-296653 |

(51) Int. Cl.
    *G06F 11/00* (2006.01)
(52) U.S. Cl.
    USPC .................. 714/44; 714/57; 399/10
(58) Field of Classification Search
    USPC ........... 714/5.1, 44, 27, 45, 46, 48, 57; 399/8, 399/9, 10, 15, 81
    See application file for complete search history.

(56) References Cited

U.S. PATENT DOCUMENTS

| 6,493,656 | B1 * | 12/2002 | Houston et al. | 702/187 |
| 6,788,902 | B2 * | 9/2004 | Funahashi | 399/8 |
| 6,876,819 | B2 * | 4/2005 | Sawada et al. | 399/9 |
| 2002/0133314 | A1 * | 9/2002 | Shibata | 702/184 |
| 2004/0078783 | A1 | 4/2004 | Matsushima | 717/126 |
| 2005/0185993 | A1 * | 8/2005 | Kobayashi | 399/309 |
| 2006/0133841 | A1 * | 6/2006 | Haga | 399/81 |
| 2007/0083797 | A1 * | 4/2007 | Tsuzuki | 714/48 |
| 2007/0220353 | A1 * | 9/2007 | Iura et al. | 714/39 |
| 2007/0283233 | A1 * | 12/2007 | Saito | 714/807 |
| 2008/0155091 | A1 * | 6/2008 | Gokhale et al. | 709/224 |
| 2009/0287962 | A1 * | 11/2009 | Bakekolo et al. | 714/38 |

FOREIGN PATENT DOCUMENTS

| JP | 04-114238 | 4/1992 |
| JP | 11-161523 | 6/1999 |
| JP | 11-306050 | 11/1999 |
| JP | 2001-188726 | 7/2001 |
| JP | 2003-044326 | 2/2003 |
| JP | 2003-294813 | 10/2003 |
| JP | 2004-192293 | 7/2004 |
| JP | 2005-173958 | 6/2005 |
| JP | 2005-258686 | 9/2005 |

(Continued)

*Primary Examiner* — Scott Baderman
*Assistant Examiner* — Joseph Kudirka
(74) *Attorney, Agent, or Firm* — Ostrolenk Faber LLP

(57) ABSTRACT

An electronic device includes: a memory unit; and a control unit which selects, from a set of information corresponding to a plurality of errors, selected information corresponding to an error that occurred, such that at least one of a type and a frequency of the error that occurred satisfies/satisfy a predetermined condition. The control unit also causes the memory unit to store the selected information.

10 Claims, 24 Drawing Sheets

FOREIGN PATENT DOCUMENTS

| | | |
|---|---|---|
| JP | 2005-332160 | 12/2005 |
| JP | 2006-011231 | 1/2006 |
| JP | 2006-041764 | 2/2006 |
| JP | 2007-233465 | 9/2007 |
| JP | 2007-334474 | 12/2007 |
| JP | 2008-035224 | 2/2008 |

* cited by examiner

COPYING SETTING SELECTION
SCREEN DISPLAYING BUTTON

COPYING SETTING SELECTION
SCREEN DISPLAYING BUTTON

ELECTRONIC DEVICE SAVING SELECTED ERROR INFORMATION AND AN ERROR MANAGEMENT SYSTEM INCLUDING SUCH A DEVICE

The present application claims priority on Japanese Patent Application No. 2008-218268, filed Aug. 27, 2008; Japanese Patent Application No. 2008-220134, filed Aug. 28, 2008; Japanese Patent Application No. 2008-218269, filed Aug. 27, 2008; Japanese Patent Application No. 2008-260907, filed Oct. 7, 2008; Japanese Patent Application No. 2008-260908, filed Oct. 7, 2008; and Japanese Patent Application No. 2008-296653, filed Nov. 20, 2008; the contents of which are incorporated herein by reference.

BACKGROUND OF THE INVENTION

1. Field of the Invention

The present invention relates to an electronic device and an error management system.

2. Description of the Related Art

Various electronic devices such as personal computers, cellular phones, printers, multifunction peripherals, and household electrical appliances are composed of hardware devices such as CPU (Central Processing Unit) and memory, as well as software executed by the CPU. These hardware devices and software included in the electronic devices malfunction in many ways due to multiple causes occurring while various processings such as operational processing, communication processing, and standby processing are carried out. For instance, when the electronic device includes software with a design defect, grave malfunctions occur. Examples of these grave malfunctions include the electronic device operating in a way contrary to what the developer of the electronic device intended, and the electronic device not starting up. When the electronic device malfunctions in these ways while the electronic device is being developed, the developer will analyze the malfunction and will identify its cause. When the malfunction occurs while the electronic device is being manufactured, the manufacturer will analyze the malfunction and will identify its cause. When the malfunction occurs while the electronic device is on sale, the personnel in charge of maintenance work will analyze the malfunction and will identify its cause. In general, the personnel analyzing the malfunction identifies its cause based on error information such as an error log file including records of the operations performed by various functions of the electronic device, as well as records of the results of these operations.

An example of related technology is a framework that writes into an external memory medium, all of the error information and production information stored in a control device of a semiconductor manufacturing device, and displays on a screen, the error information and the like obtained from the external memory medium.

The framework described above stores all of the various error information into an external memory field that is portable and can be easily exchanged. Thus, it is possible to analyze the error information at a place outside of a clean room equipped with a control device.

However, errors include fatal errors and trivial errors. The error information concerning both of these errors is stored in the same way. In such a case, the error information concerning fatal errors is effectively used to identify the cause of the error. Meanwhile, error information concerning trivial errors is not necessarily used to analyze errors. As a result, error information concerning trivial errors is sometimes wasted even though it is saved. When such trivial errors occur frequently, unnecessary error information accumulates in the memory field in which error information is stored. Consequently, there will not be enough free space available in the memory field.

Another example of related technology is a framework that displays an error message on a screen of an application (hereinafter may be referred to as the "application screen") when an error occurs while the application is running. When a user presses a "CLOSE" button displayed on the screen showing the error message (hereinafter may be referred to as the "error message screen"), the framework stores into a memory, an image data of the error message screen and the application screen located below the error message screen.

However, the framework described above saves the screen that was displayed after the user pressed the button after a certain amount of time has passed since the error occurred. Furthermore, the framework saves the screen that was displayed after a display control processing and an operation control processing have been performed on the error that occurred. As a result, the application screen that is saved is different from the application screen that was displayed at the time the error occurred. Thus, the saved application screen might not be used to identify the cause of the malfunction.

In addition, according to the framework described above, the personnel analyzing the malfunction recognizes that error information is stored in the memory, when the error information is displayed on the liquid crystal display based on a command to output the error information. Consequently, even though the error information is stored in the memory due to the occurrence of the error, the personnel analyzing the malfunction cannot recognize immediately after the error occurs that the error information has been stored.

Moreover, when the error message is being displayed and the reset timer times out or the user resets the framework by manipulating certain buttons, the setting values of the various settings of the display on the application screen may be reset and may return to the default value. Even though the reset application screen is stored based on this framework, there may not be any information left that would be useful for analyzing the malfunction.

Furthermore, even though the operation at the time of the error can be recognized through the saved application screen, the operation before the error and the log of the user's operation cannot be recognized.

In this way, the frameworks based on the related art cannot adequately save the information useful for analyzing the malfunction. Therefore, the malfunction cannot be analyzed efficiently.

Considering the problems described above, a first object of the present invention is to provide an electronic device that can maintain enough free space in the memory field in which the error log is stored. A second object of the present invention is to provide an electronic device that can further enhance the efficiency of analyzing malfunctions. A third object of the present invention is to provide an electronic device and an error management system that can more rapidly respond to errors when the errors occur. A fourth object of the present invention is to provide an electronic device that can further enhance the efficiency of analyzing malfunctions by reliably obtaining information that is useful for the analysis.

SUMMARY OF THE INVENTION

In order to achieve the above object, the present invention employs the following:

Namely, an electronic device according to an aspect of the present invention includes: a memory unit in which a plurality of error information is stored; and a control unit selecting from among the plurality of error information, an error information such that at least one of a type and a frequency of the error that occurred satisfies/satisfy a predetermined condition, the control unit also making the memory unit save the error information.

On the other hand, an electronic device according to another aspect of the present invention includes: a display unit; a memory unit storing an image displayed on the display unit; a communication unit communicating with an external party; a control unit converting the image displayed on the display unit when an error occurred into a first image file and storing this first image file as a first error information to the memory unit, displaying an error notification screen on the display unit indicating that the error occurred, converting the error notification screen displayed on the display unit into a second image file and storing this second image file as a second error information to the memory unit; and an output control unit outputting the first error information and the second error information according to an instruction from the external party.

On the other hand, an electronic device according to an aspect of the present invention includes: a display unit; a display screen storing unit storing a screen data being a basis of an image displayed on the display unit; a preparation screen storing unit storing the screen data corresponding to an operation performed in a background and the screen data which can be displayed after the image displayed on the display unit; an error information storing unit storing an error information; a memory control unit making the error information storing unit store the screen data saved by the display screen storing unit when an error occurs, and the screen data saved by the preparation screen storing unit, respectively as a first error information; and an output control unit outputting the first error information based on an instruction from an external party.

The above object as well as other objects of the present invention and the present invention's characteristics and advantages will become clearer from the appended figures and the detailed description below.

DETAILED DESCRIPTION OF THE PREFERRED EMBODIMENTS

Figure 1:
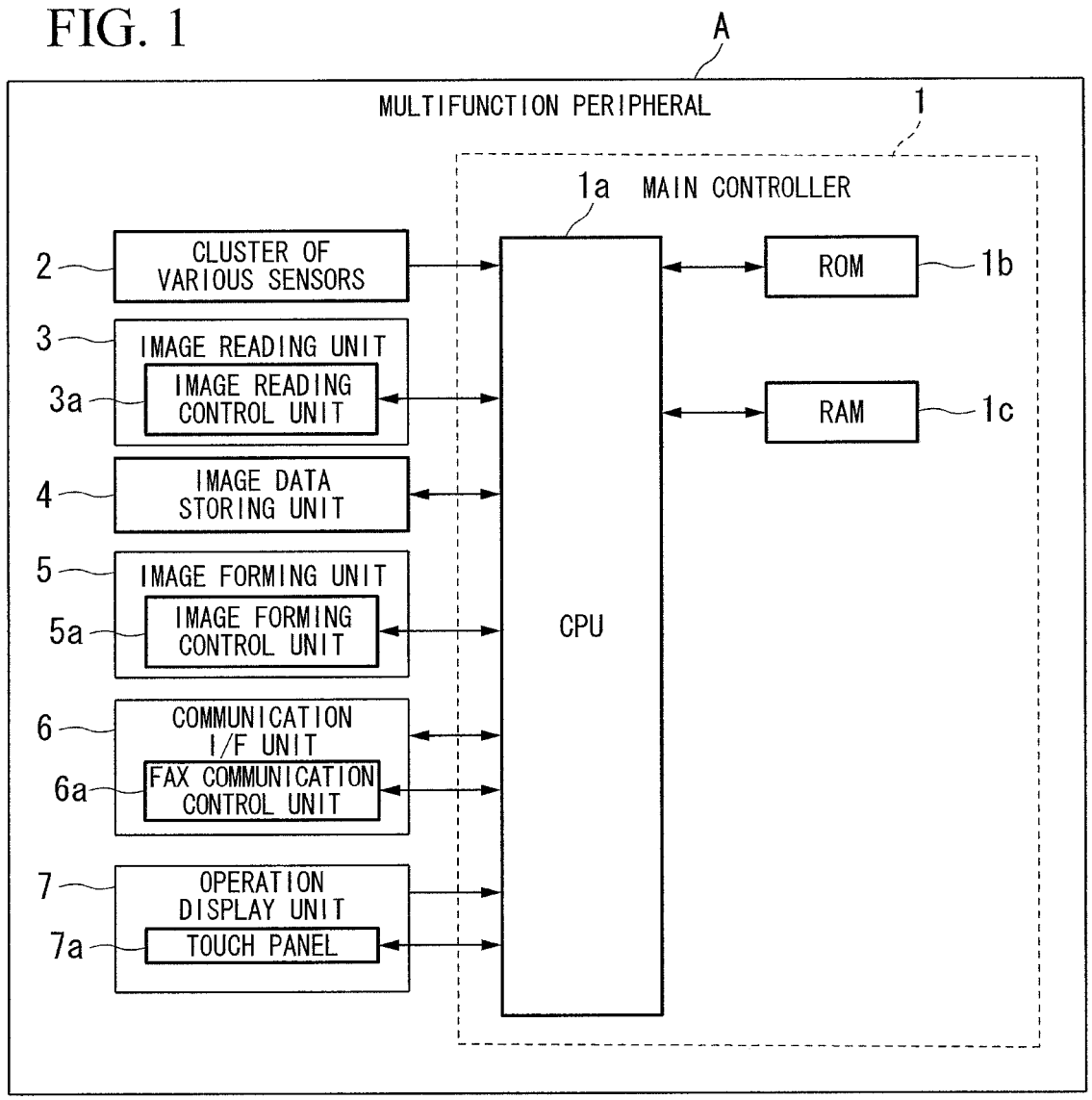
FIG. 1 is a functional block diagram of a multifunction peripheral A according to a first embodiment of the present invention.
Figure 2:
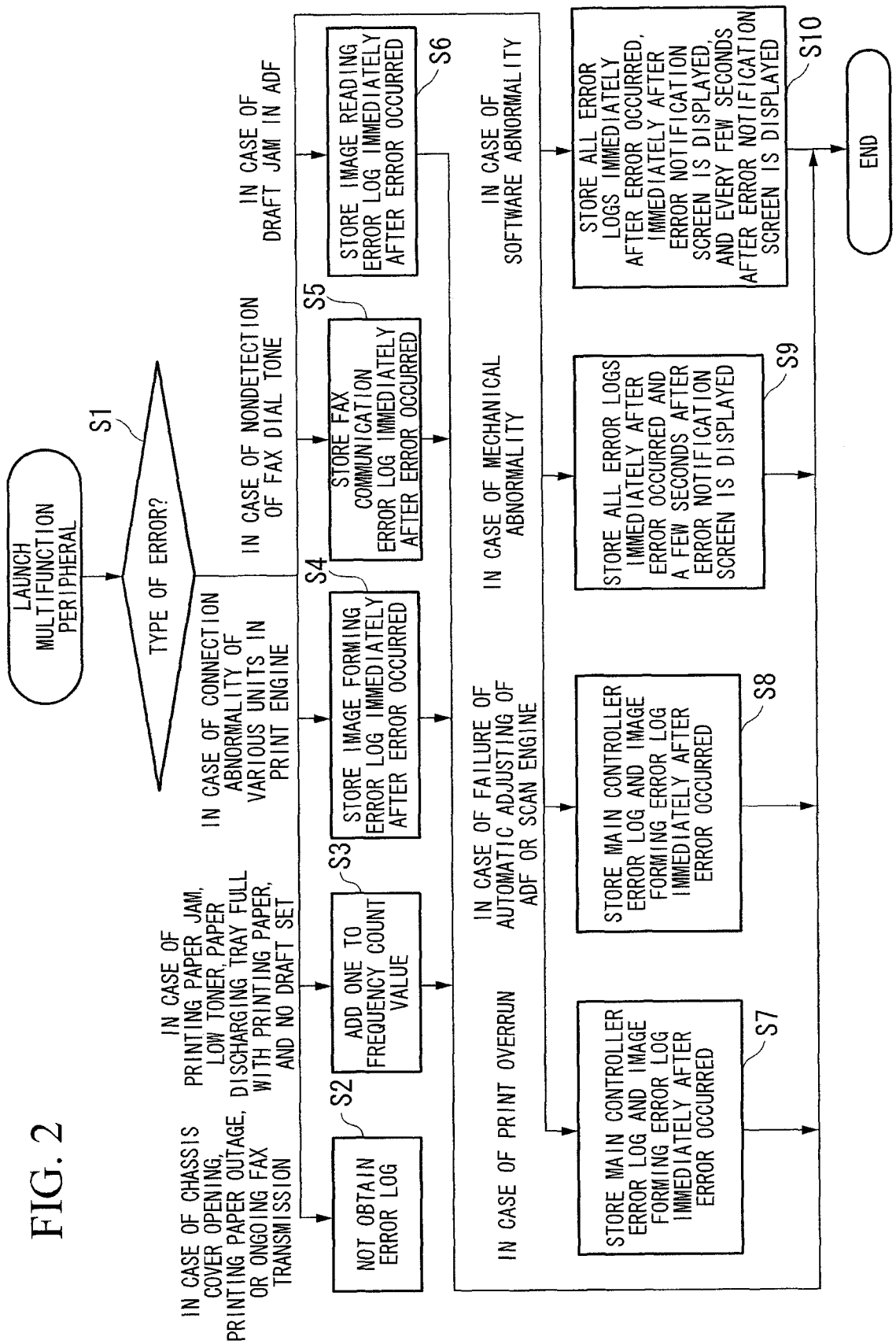
FIG. 2 is a flowchart showing an operation of the multifunction peripheral A according to the above embodiment of the present invention.

Hereunder, a first embodiment of an electronic device according to the present invention is described with reference to FIGS. 1 and 2. The above embodiment concerns a multifunction peripheral equipped with a copying feature, a printing feature, and a facsimile sending/receiving feature, the multifunction peripheral being a type of an image forming device.

The electronic device according to an aspect of the present invention includes: a memory unit in which a plurality of error information is stored; and a CPU 1a selecting from among the plurality of error information, an error information such that at least one of a type and a frequency of the error that occurred satisfies/satisfy a predetermined condition, the CPU 1a also making the memory unit save the error information.

First, the functions and configuration of a multifunction peripheral A are described with reference to FIG. 1. The multifunction peripheral A includes a main controller 1, a cluster of various sensors 2, an image reading unit 3, an image data storing unit 4, an image forming unit 5, a communication I/F unit 6, and an operation display unit 7.

The main controller 1 includes the CPU 1a, a ROM 1b, and a RAM 1c.

The CPU 1a controls the overall operations of the multifunction peripheral A based on a control program stored in the ROM 1b, draft image data stored in the image data storing unit 4, image data from a printer or a facsimile, various instructions inputted via the communication I/F unit 6 from a client computer (not diagramed) or a public network (not diagramed), and instructions inputted from the operation display unit 7. The details of the control processing performed by the CPU 1a will be described below as an explanation of the operation of the multifunction peripheral A.

The ROM 1b is a nonvolatile memory that stores the control program executed by the CPU 1a and other data.

The RAM 1c is a volatile memory used as a working area in which data is temporarily stored when the CPU 1a performs various operations by executing the control program.

The cluster of various sensors 2 include multiple sensors that are necessary for forming images, such as a printing paper outage detecting sensor, a printing paper jam detecting sensor, a printing paper position detection sensor, a draft paper jam detecting sensor, a low-toner detection sensor, a cover opening detection sensor, and a temperature sensor. The cluster of various sensors 2 outputs the various detected information to the CPU 1a as a detection signal.

The image reading unit 3 includes, for example, an ADF (Automatic Draft Feeding Device), a CCD (Charge Coupled Device) sensor, and a scanner engine. The scanner engine has an image reading control unit 3a which includes the CPU, the ROM, and the RAM. The image reading control unit 3a controls the ADF, the CCD, and the scan engine under the command of the CPU 1a. The image reading control unit 3a makes the CCD sensor read the image of the draft supplied by the ADF. Then, the image reading control unit 3a of the scanner engine outputs the draft image data based on the draft image. The image reading control unit 3a of the image reading unit 3 outputs the draft image data to the CPU 1a. Meanwhile, the CPU 1a stores the draft image data to the image data storing unit 4.

Examples of the image data storing unit 4 include flash memory or hard disc. Under the command of the CPU 1a, the image data storing unit 4 stores the draft image data, the print image data received by the communication I/F unit 6 from the client computer (not diagramed), and the facsimile image data received by the communication I/F unit 6 from the public network (not diagramed).

The image forming unit 5 includes the print engine and the image forming control unit 5a. The print engine is a machine that carries out the physical procedure of forming an image, and includes, for example, a paper feed roller, a motor photoconductor drum for operating the paper feed roller, an electrostatically charging apparatus, a developing apparatus, a fixing roller, a paper discharging roller, and a motor for operating a transporting roller. Under the command of the CPU 1a, the image forming control unit 5a controls the image forming operation performed by the image forming unit 5. At the image forming unit 5, the image forming control unit 5a transports the printing paper stored in the paper feed cassette to the paper feed roller of the print engine.

Then, based on the draft image data stored in the image data storing unit 4, the print image data, or the facsimile image data, the image forming control unit 5a transcribes the image formed by the toner onto the printing paper that was transported. In addition, the image forming control unit 5a makes the print engine perform the fixing process. The image forming control unit 5a also makes the paper discharging roller transport the printing paper, to which an image has been formed, to the paper discharging tray of the print engine.

The communication I/F unit 6 has a LAN board and a FAX board. The LAN board has a LAN connecting terminal that connects with the client computer (not diagramed) through a LAN (Local Area Network) cable. The FAX board has a telephone network connecting terminal that connects with the public telephone network of the public network (not diagramed). The communication I/F unit 6 transmits and receives various signals between the client computer and the public network. The FAX board has a FAX communication control unit 6a. Under the command of the CPU 1a, the FAX communication control unit 6a executes the control process of transmitting signals during the FAX communication.

The operation display unit 7 includes a start key, a stop key, a power source key, a numeric keypad (a number entering key), a touch panel 7a, a clear key, and other various operational keys. The operation display unit 7 outputs the operational instructions for each key to the CPU 1a. Further, under the command of the CPU 1a, the operation display unit 7 displays various screens on the touch panel 7a.

Next, the operation of the multifunction peripheral A according to the above embodiment of the present invention will be described in detail with reference to FIG. 2.

When an error occurs, the CPU 1a of the multifunction peripheral A identifies the type of error that occurred (step S1).

In step S1, when the CPU 1a determines, according to the detection signal inputted from the cluster of various sensors 2, that the error occurred because the cover of the chassis of the multifunction peripheral A is open, the printing paper is out (hereinafter may be referred to as "printing paper outage"), or because a FAX communication is ongoing, determined according to the information from the FAX communication control unit 6a of the communication I/F unit 6, the CPU 1a does not record the error log (step S2). The opening of the cover of the chassis, the printing paper outage, and ongoing FAX communications normally occur when the multifunction peripheral is operating. Thus, the user is not significantly disadvantaged by these types of errors. As a result, the error log concerning the opening of the cover of the chassis, the printing paper outage, and ongoing FAX communications is not recorded.

In step S1, when the CPU 1a determines, according to the detection signal inputted from the cluster of various sensors 2, that the error occurred because the printing paper was jammed, the toner was low, the paper discharging tray was filled with printing paper, or the draft was not set in the ADF of the image reading unit, the CPU 1a counts the frequency of each error by adding 1 to the frequency count corresponding to the occurrence of each error (step S3). The jamming of the printing paper, the low toner, the filling up of the paper discharging tray with printing paper, and the draft not being set in the ADF occur sporadically when the multifunction peripheral A is used. These types of errors, therefore, do not cause a significant problem. As a result, the error log concerning the jamming of the printing paper, the low toner, the filling up of the paper discharging tray with printing paper, and the draft not being set in the ADF is not recorded. Instead, the number of times that these errors occurred is recorded.

In step S1, when the CPU 1a determines, based on information from the image forming control unit 5a of the image forming unit 5, that the error occurred because of an abnormality in the connection between various units such as the paper feed roller included in the printer engine, the motor photoconductor drum used to operate the paper feed roller, the electrostatically charging apparatus, the developing apparatus, the fixing roller, the paper discharging roller, and the motor used to operate the transporting roller, the CPU 1a stores an image formation error log to the ROM 1b immediately after the error occurs (step S4). This image formation error log contains a record of the conditions of each unit included in the printer engine of the image forming unit 5. The abnormality in the connections between various units included in the print engine of the image forming unit 5 does not affect the functions of units other than the image forming unit 5. Therefore, the error log other than the image forming error log is not recorded.

In step S1, when the CPU 1a determines, according to the information from the FAX communication control unit 6a of the FAX board of the communication I/F unit 6, that the error occurred because a dial tone of the facsimile was not detected, the CPU 1a stores a FAX communication error log, reflecting the condition immediately after the error occurred, into the ROM 1b (step S5). The FAX communication error log contains a record of the condition of the FAX communication performed by the FAX board of the communication I/F unit 6. A non-detection of the dial tone of the facsimile does not affect the functions of units other than the FAX communication performed by the communication I/F unit 6. Therefore, the error log other than the FAX communication error log is not recorded.

In step S1, when the CPU 1a of the multifunction peripheral A determines, according to the detection signal inputted from the cluster of various sensors 2, that the error occurred because a draft was jammed in the ADF of the image reading unit 3, the CPU 1a stores an image reading error log to the ROM 1b immediately after the error occurred (step S6). The image reading error log contains a record of the conditions of the ADF of the image reading unit 3 and the scan engine. The jamming of the draft in the ADF of the image reading unit 3 does not affect the functions of units other than the image reading unit 3. Therefore, the error log other than the image reading error log is not recorded.

In step S1, when the CPU 1a determines that the error occurred because of a print overrun, the CPU 1a stores a main controller error log and the image forming error log to the ROM 1b immediately after the error occurred (step S7). The main controller error log contains a record of the control processing executed by the CPU 1a. A print overrun does not affect the functions of units other than the main controller and the image forming unit 5. Therefore, the error log other than the main controller error log and the image forming error log is not recorded.

A print overrun occurs when the speed with which the CPU 1a processes the image data stored in the image data storing unit 4 and outputs the processed image data to the image forming unit 5 is slow compared to the speed with which the image is transcribed at the image forming unit 5 while the printing paper is being transported. Due to the print overrun, the image printed on the printing paper is not smooth and is discontinuous. The CPU 1a detects print overruns by monitoring the processing of the image forming unit 5 and the process of outputting the image data to the image forming unit 5.

In step S1, when the CPU 1a determines, according to the information from the image forming control unit 5a of the image forming unit 5, that the error occurred because of a failure in the auto-tuning of the ADF or the scan engine, the CPU 1a records the main controller error log and the image forming error log to the ROM 1b immediately after the error occurred (step S8). A failure in the auto-tuning of the ADF or the scan engine does not affect the functions of units other than the main controller 1 and the image forming unit 5. Therefore, the error log other than the main controller error log and the image forming error log is not recorded.

In step S1, when the CPU 1a determines, according to the detection signal inputted from the cluster of various sensors 2, that the error occurred because of a mechanical abnormality in the image reading unit 3 or the image forming unit 5, the CPU 1a records the main controller error log, the image forming error log, the FAX communication error log, and the image reading error log into the ROM 1b immediately after the error occurred and a few seconds after the error notification screen is displayed on the touch panel 7a (step S9).

A mechanical abnormality may occur repeatedly. Therefore, the CPU 1a records the error log twice after the error occurred. In addition, when a mechanical abnormality occurs, it is necessary to analyze the error and identify its cause. Further, a mechanical abnormality has a far-reaching impact on the multifunction peripheral A. Therefore, the CPU 1a records all of the error logs, namely, the main controller error log, the image forming error log, the FAX communication error log, and the image reading error log.

In step S1, when the CPU 1a determines that the error occurred because of a software abnormality, the CPU 1a records the main controller error log, the image forming error log, the FAX communication error log, and the image reading error log to the ROM 1b immediately after the error occurred, immediately after the error notification screen is displayed on the touch panel 7a, and every few seconds after the error notification screen is displayed (step S10). When a software abnormality occurs, it is necessary to analyze the error and identify its cause. Further, a software abnormality has a far-reaching impact on the multifunction peripheral A. Therefore, the CPU 1a records all of the error logs, namely, the main controller error log, the image forming error log, the FAX communication error log, and the image reading error log. In addition, the error log is recorded continuously because the information useful for identifying the error concerning software abnormalities may be outputted through a loop process.

As described above, based on the multifunction peripheral A according to the above embodiment of the present invention, the CPU 1a records all of the error logs continuously when a mechanical abnormality and a software abnormality occur. Mechanical abnormalities and software abnormalities are types of errors that require analysis. On the other hand, when trivial errors such as an opening of the cover of the chassis or a jamming of printing paper occur, the error log is not recorded. When an error occurred because of an abnormality in the connection between various units in the print engine, the impact of the error is limited. In such a case, only the error log of the function related to the error will be recorded only once. Therefore, it is possible to maintain enough free space in the ROM 1b that records the error log.

Heretofore, the first embodiment of the electronic device according to the present invention was described. However, the present invention is not limited by the above embodiment. For example, the following modification can be made.

The above embodiment concerned a multifunction peripheral A, which is an image forming device. However, the above embodiment can also be applied to devices other than an image forming device, such as a personal computer, a handheld device, and various household electrical appliances.

Based on the above embodiment, the CPU 1a recorded as the image forming error log, a record of the conditions of the various units included in the printer engine of the image forming unit 5. However, the present invention is not limited by the above embodiment.

For example, if the multifunction peripheral A is connected to a finisher and a paper feeding deck, the conditions of the finisher and the paper feeding deck can also be recorded in the image forming error log.

Based on the above embodiment, when the CPU 1a obtains an error log, the CPU obtains a certain volume of error logs according to the type of the error. However, the present invention is not limited by the above embodiment.

For example, when an error occurs such that an error log of the error must be obtained, the information amount of the error log obtained by the CPU 1a can be reduced if the same error occurred sometime earlier (a few seconds earlier) and the CPU 1a has already obtained the error log. Thus, the CPU 1a obtains the error log every time the same error occurs. According to the above configuration, it is possible to prevent the volume of the error log from increasing too much.

Hereunder, a second embodiment of the electronic device according to the present invention is described with reference to FIGS. 3, 4, 5, and 6. The above embodiment concerns a multifunction peripheral equipped with a copying feature, a printing feature, and a facsimile sending/receiving feature, the multifunction peripheral being a type of an image forming device.

Figure 3:
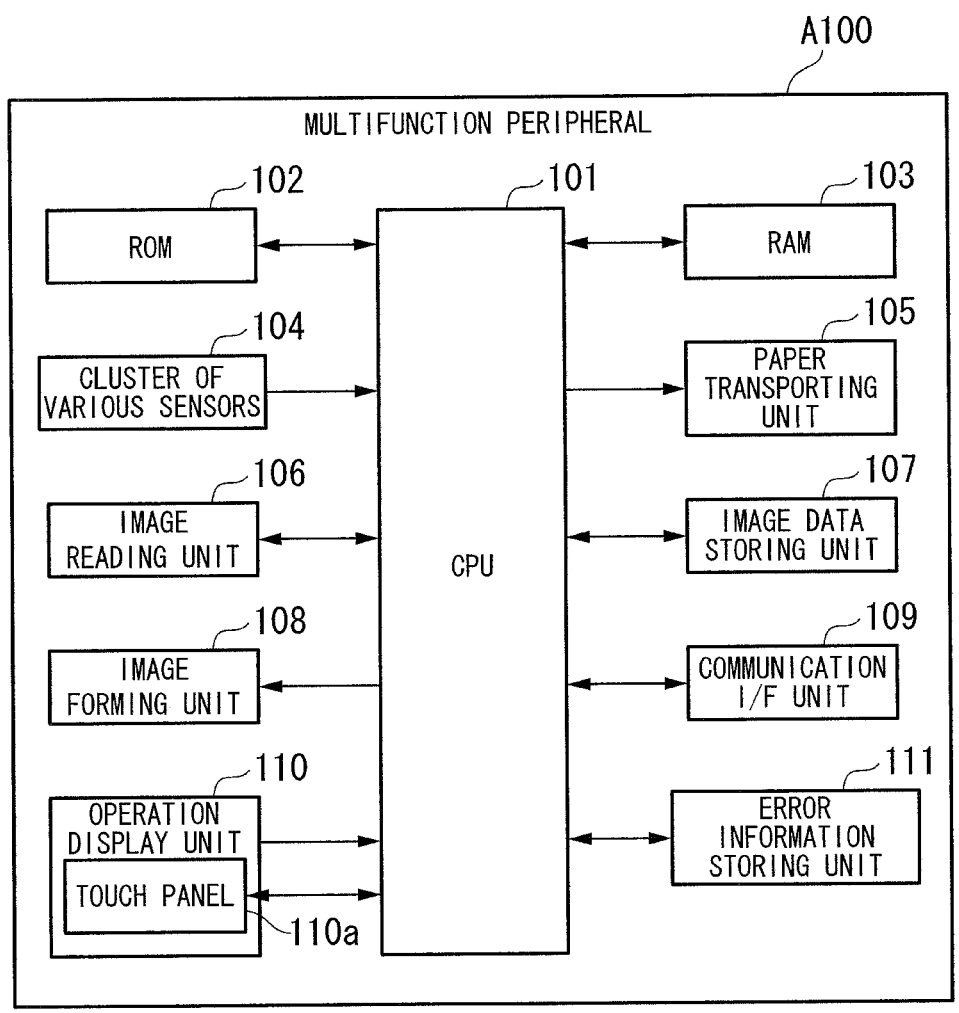
FIG. 3 is a functional block diagram of a multifunction peripheral A100 according to a second embodiment of the present invention.

First, the functions and configuration of a multifunction peripheral A100 are described with reference to FIG. 3. The multifunction peripheral A100 includes a CPU (Central Processing Unit) 101, a ROM (Read Only Memory) 102, a RAM (Random Access Memory) 103, a cluster of various sensors 104, a paper transporting unit 105, an image reading unit 106, an image data storing unit 107, an image forming unit 108, a communication I/F unit 109, an operation display unit 110, and an error information storing unit 111.

The CPU 101 controls the overall operations of the multifunction peripheral A100 based on a control program stored in the ROM 102, draft image data stored in the image data storing unit 107, image data from a printer or a facsimile, various instructions inputted via the communication I/F unit 109 from a client computer (not diagramed) or a public network (not diagramed), and instructions inputted from the operation display unit 110. The details of the control processing performed by the CPU 101 will be described below as an explanation of the operation of the multifunction peripheral A100.

The ROM 102 is a nonvolatile memory that stores the control program executed by the CPU 101 and other data.

The RAM 103 is a volatile memory used as a working area in which data is temporarily stored when the CPU 101 performs various operations by executing the control program.

The cluster of various sensors 104 includes multiple sensors that are necessary for forming images, such as a paper outage detecting sensor, a paper jam detecting sensor, a paper position detection sensor, and a temperature sensor. The cluster of various sensors 104 outputs the various detected information to the CPU 101 as a detection signal.

The paper transporting unit 105 includes a first transporting roller that transports printing paper, stored in the paper tray, to the image forming unit 108; a motor for operating the first transporting roller; a second transporting roller that, after the image forming process has been completed, transports printing paper to a discharging tray (not diagramed); and a motor for operating the second transporting roller.

The image reading unit 106 includes, for example, an ADF (Automatic Draft Feeding Device), a CCD (Charge Coupled Device) sensor and the like. The image reading unit 106 makes the CCD sensor read the image of the draft supplied by the ADF. The image reading unit 106 also outputs the draft image data based on the draft image. The image reading unit 106 outputs the draft image data to the CPU 101. Meanwhile, the CPU 101 stores the draft image data to the image data storing unit 107.

An example of the image data storing unit 107 is flash memory. Under the command of the CPU 101, the image data storing unit 107 stores the draft image data, the print image data received by the communication I/F unit 109 from the client computer (not diagramed), and the facsimile image data received by the communication I/F unit 109 from the public network (not diagramed).

Based on the draft image data stored in the image data storing unit 107, the print image data, or the facsimile image data, the image forming unit 108 transcribes, under the control of the CPU 101, the image formed by the toner onto the printing paper that was transported from the paper transporting unit 105. In addition, the image forming unit 108 performs the fixing process of the image by using a fixing roller.

The communication I/F unit 109 connects to a client computer (not diagramed) and a public network (not diagramed) and the like. The communication I/F unit 109 transmits and receives various signals between the client computer and the public network.

The operation display unit 110 includes a start key, a stop key, a power source key, a numeric keypad (a number entering key), a touch panel 110a, a clear key, and other various operational keys. The operation display unit 110 outputs the operational instructions for each key to the CPU 101. Further, under the command of the CPU 101, the operation display unit 110 displays various screens on the touch panel 110a. A flash memory is an example of the error information storing unit 111. When various errors occur with respect to the multifunction peripheral A100, the error information storing unit 111 stores various error information under the control of the CPU 101. The personnel in charge of analyzing the abnormality uses this error information when he or she analyzes the error.

Figure 4:
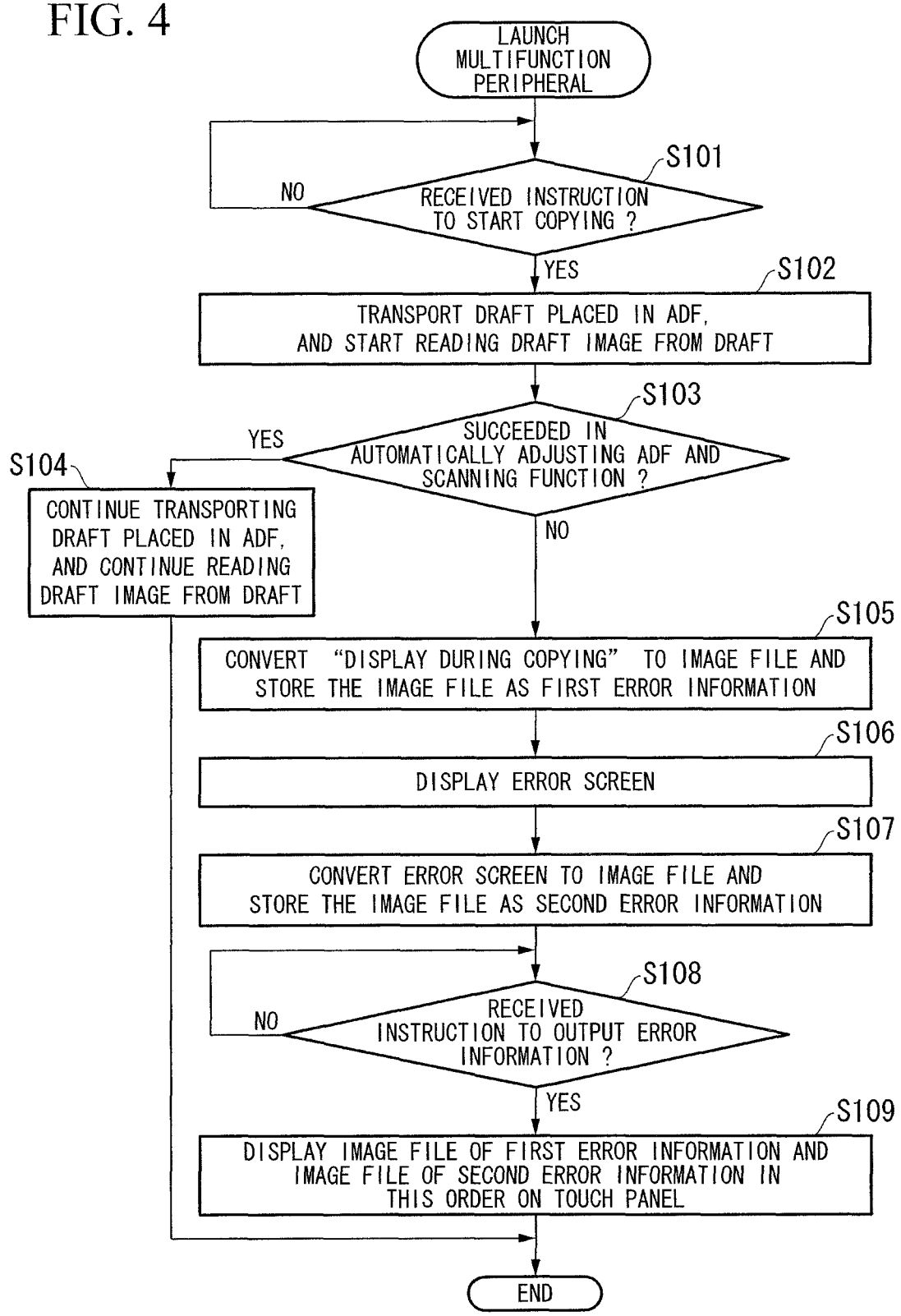
FIG. 4 is a flow chart showing an operation of the multifunction peripheral A100 according to the above embodiment of the present invention.

Next, the operation of the multifunction peripheral A100 according to the above embodiment of the present invention will be described in detail with reference to FIG. 4.

First, a user who tries to copy a draft with the multifunction peripheral A100 prepares the copying settings such as copying magnification by manipulating the keys of the operation display unit 110. When the user completes preparing the copying settings, the user sets the draft to the ADF of the image reading unit 106. Then, the user starts the copying process of the multifunction peripheral A100 by pressing the start key of the operation display unit 110.

The CPU 101 determines whether or not the operation display unit 110 received instructions to start the copying process by the pressing of the start key (step S01). If the result of step S01 is NO, the operation display unit 110 has not received instructions to start the copying process. In this case, the CPU 101 waits until the operation display unit 110 receives instructions to start the copying process. If the result of step S101 is YES, the operation display unit 110 has received instructions to start the copying process. In this case, the CPU 101 makes the image reading unit 106 transport the draft placed in the ADF. At the same time, the CPU 101 makes the image reading unit 106 initiate the reading of the draft image from the draft (step S102).

After the CPU 101 makes the image reading unit 106 initiate the reading of the draft image from the draft in step S102, the CPU 101 makes the image reading unit 106 automatically adjust the ADF and the scanning function. Then, the CPU 101 determines whether or not the image reading unit 106 succeeded in automatically adjusting the ADF and the scanning function (step S103). If the result of step S103 is YES, the image reading unit 106 has succeeded in automatically adjusting the ADF and the scanning function. In this case, the CPU 101 makes the image reading unit 106 continue transporting the draft placed in the ADF and also continue reading the draft image from the draft (step S104).

Figure 5:
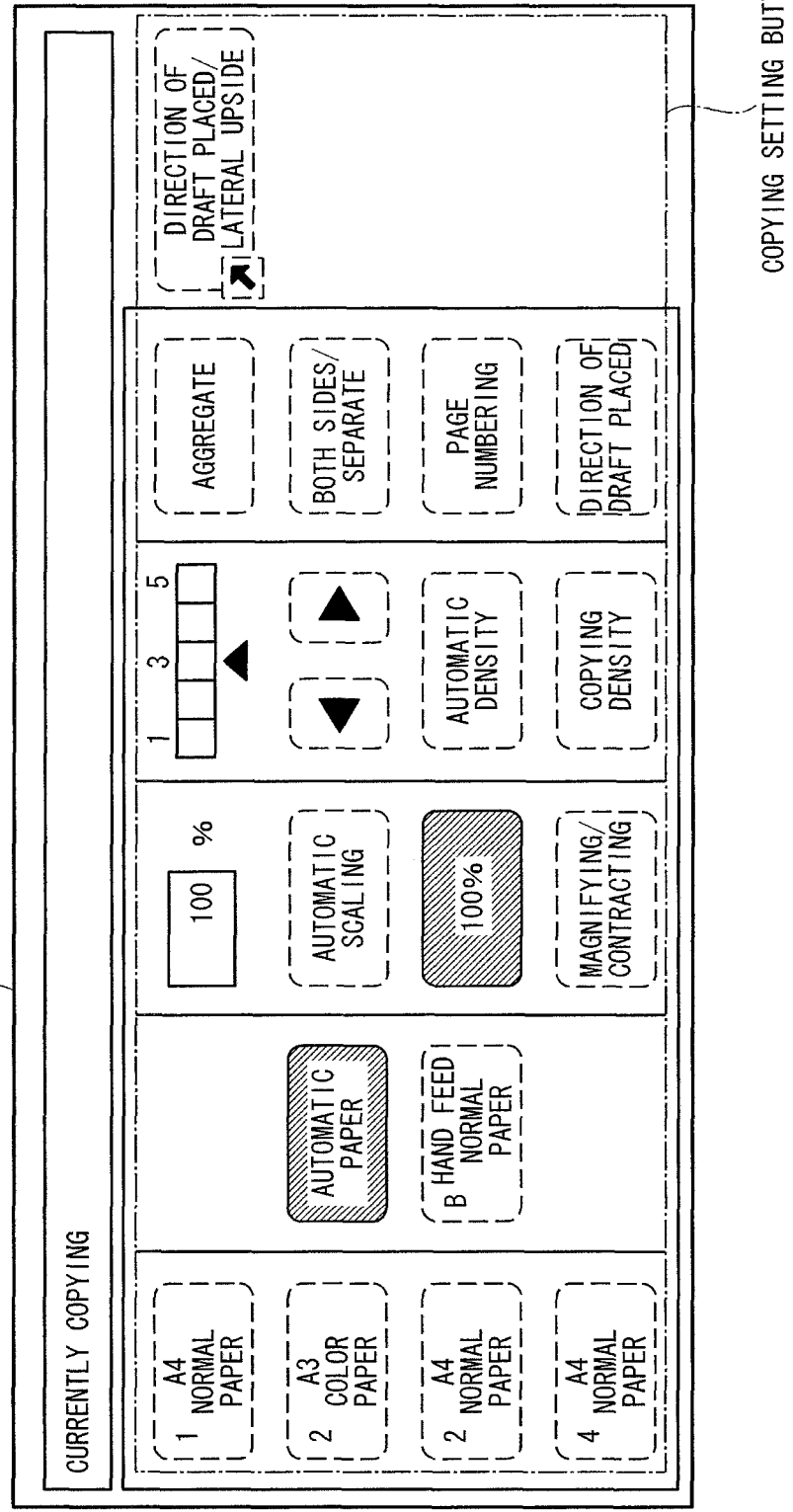
FIG. 5 is a diagram showing a screen displayed on a touch panel 110a of the multifunction peripheral A100 according to the above embodiment of the present invention while copying is performed.

When the CPU 101 determines that the result of step S103 is NO, the image reading unit 106 has not succeeded in automatically adjusting the ADF or the scanning function. In this case, the display currently shown on the touch panel 110a (hereinafter referred to as the "display during copying") will be converted to an image file such as JPEG or GIF and the like. Then, this image file will be stored into the error information storing unit 111 as the first error information (step S105). FIG. 5 presents an example of the display during copying shown on the touch panel 110a of the multifunction peripheral A100 according to the above embodiment of the present invention.

According to the multifunction peripheral A100, when the operation display unit 110 receives instructions to start the copying process by the pressing of the start key, the touch panel 110a shows the display during copying as presented in FIG. 5. The message, "Currently Copying," is shown on this display during copying, indicating that the multifunction peripheral A100 is performing the copying process. At the same time, various buttons for preparing the copying settings (hereinafter may be referred to as "setting buttons") are shown on the display during copying. Among these various setting buttons, the color of the button corresponding to the copying setting that is selected in the current copying process is inverted. Meanwhile, the color of the button corresponding to the copying setting that is not selected is gray. These gray buttons are indicated in FIG. 5 as the setting buttons drawn with dashed lines on the copying display.

Figure 6:
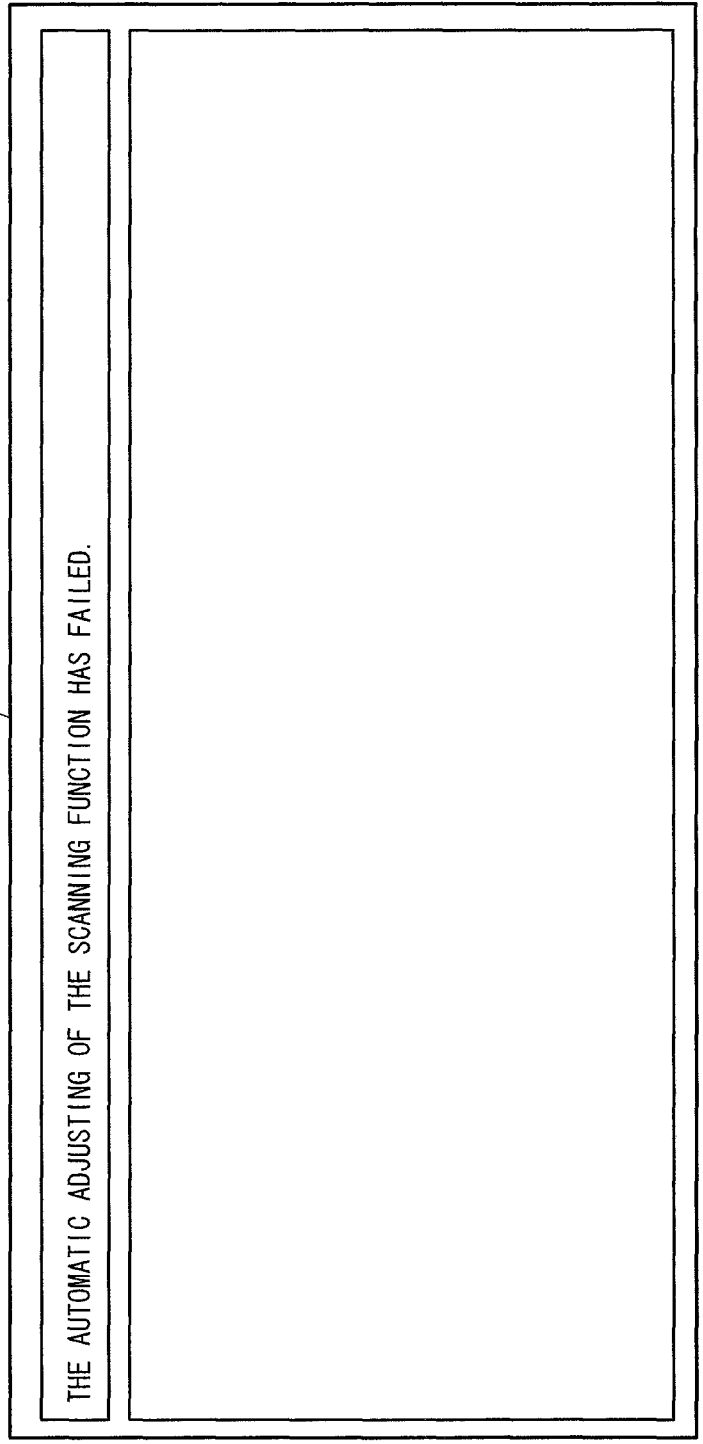
FIG. 6 is a diagram showing an error notification screen displayed on the touch panel 110a of the multifunction peripheral A100 according to the above embodiment of the present invention.

After step S105, the CPU 101 displays on the touch panel 110a, an error notification display showing an error message notifying that the image reading unit 106 failed to automatically adjust the ADF or the scanning function (step S106). In addition, the CPU 101 converts the error notification display shown on the touch panel 110a to an image file such as JPEG or GIF and the like. Then, the CPU 101 stores this image file to the error information storing unit 111 as the second error information (step S107). FIG. 6 presents an example of the error notification display shown on the touch panel 110a of the multifunction peripheral A100 according to the above embodiment of the present invention.

According to the multifunction peripheral A100, the first error information is stored in the error information storing unit 111 in step S105. Then, in step S106, the error notification display presented in FIG. 6 is shown on the touch panel 110a. For example, when the image reading unit 106 fails to automatically adjust the scanning function, the error notification display shows, as presented in FIG. 6, an error message "The Automatic Adjusting of the Scanning Function has Failed," notifying that the automatic adjusting of the scanning function did not succeed.

Further, after step S107, the CPU 101 determines whether the operation display unit 110 has received instructions to output the error information by the manipulation of the keys (step S108). If the result of step 108 is NO, the operation display unit 110 has not received instructions to output the error information. In this case, the CPU 101 waits until the operation display unit 110 instructions to output the error information. If the result of step S108 is YES, the operation display unit 110 has received instructions to output the error information. In this case, the CPU 101 displays on the touch panel 110a, the image file corresponding to the first error information stored in the error information storing unit 111 and the image file corresponding to the second error information in this order (step S109).

As described above, based on the multifunction peripheral A100 according to the above embodiment of the present invention, when the operation display unit 110 receives instructions to start the copying process, the CPU 101 makes the image reading unit 106 transport the draft placed in the ADF. At the same time, the CPU 101 makes the image reading unit 106 start reading the draft image from the draft. The CPU 101 makes the image reading unit 106 automatically adjust the ADF and the scanning function. When the image reading unit 106 fails to automatically adjust the ADF or the scanning function, the CPU 101 determines that the automatic adjustment by the image reading unit 106 has failed. At this time, the CPU 101 converts the copying display shown on the touch panel 110a to an image file. The CPU 101 also stores this image file to the error information storing unit 111 as the first error information. Then, the CPU 101 converts the error notification display shown on the touch panel 110a to an image file. The CPU 101 also stores this image file to the error information storing unit 111 as the second error information. When the operation display unit 110 receives instructions to output the error information, the CPU 101 displays the first error information and the second error information to the touch panel 110a.

In this way, according to the above embodiment of the present information, when the display shown when the error occurred is stored, and instructions to output the error information is received, the saved displays are shown on the touch panel 110a. Thus, the personnel in charge of analyzing the abnormality can analyze the error based on the display that has not changed from the occurrence of the error, because it is highly probable that the display contains hints helpful for identifying the cause of the error. In addition, by saving the display shown immediately after the error occurred, there is a greater possibility that the personnel in charge of analyzing the abnormality will identify the cause of the error by studying the display. As a result, there is a reduced need for the personnel to analyze the error using other sources. Consequently, the error analysis becomes more efficient.

Heretofore, the second embodiment of the present invention was described. The present invention is not limited by the above embodiment. For example, the following modification can be made.

Based on the above embodiment, when the CPU 101 determines after the copying process has started that the image reading unit 106 failed to automatically adjust the ADF or the scanning function, the CPU 101 converts to image files, the copying display shown at the time the determination was made and the error notification display later shown on the touch panel 110a. The CPU 101 then saves these image files to the error information storing unit 111 as the first error information and the second error information. However, the present invention is not limited by the above embodiment.

For example, when the CPU 101 determines after the copying process has started that an error like an image forming overrun has occurred in the image forming unit 108, the CPU 101 may save to the error information recording unit 111, the image files of the display shown on the touch panel 110a at the time the error occurred and the error notification display later shown on the touch panel 110a. In other words, the saving of the first error information and the second error information is not limited to the instance in which the error has occurred in the image reading unit 106 during the copying process. Furthermore, the error information storing unit 111 can store the first error information and the second error information when an error occurs during processes other than copying such as during the printing process or the facsimile sending and receiving process performed by the multifunction peripheral A100. Moreover, the above embodiment can also be applied to devices other than an image forming device, such as a personal computer, a handheld device, and various household electrical appliances.

Based on the above embodiment, when the operation display unit 110 receives instructions to output error information, the CPU 101 displays on the touch panel 110a, the image file corresponding to the first error information stored by the error information storing unit 111 and the image file corresponding to the second error information. However, the present invention is not limited by the above embodiment.

For example, the CPU 101 can receive instructions from a personal computer (not diagramed) connected with the communication I/F unit 109 of the multifunction peripheral A100, and based on the instructions, output to the personal computer, the first error information and the second error information stored in the error information storing unit 111. The personnel in charge of analyzing tie abnormality can then analyze tie error by displaying the image files corresponding to the first error information and the second error information on the computer screen.

Hereunder, a third embodiment of the present invention is described with reference to FIGS. 7, 8, 9, 10, and 11. The above embodiment concerns a multifunction peripheral equipped with a copying feature, a printing feature, and a facsimile sending/receiving feature, the multifunction peripheral being a type of an image forming device included in the electronic device according to the present invention. The above embodiment also concerns an error management system including the multifunction peripheral.

First, the system configuration of the error management system A200 is described with reference to FIG. 7.

Figure 7:
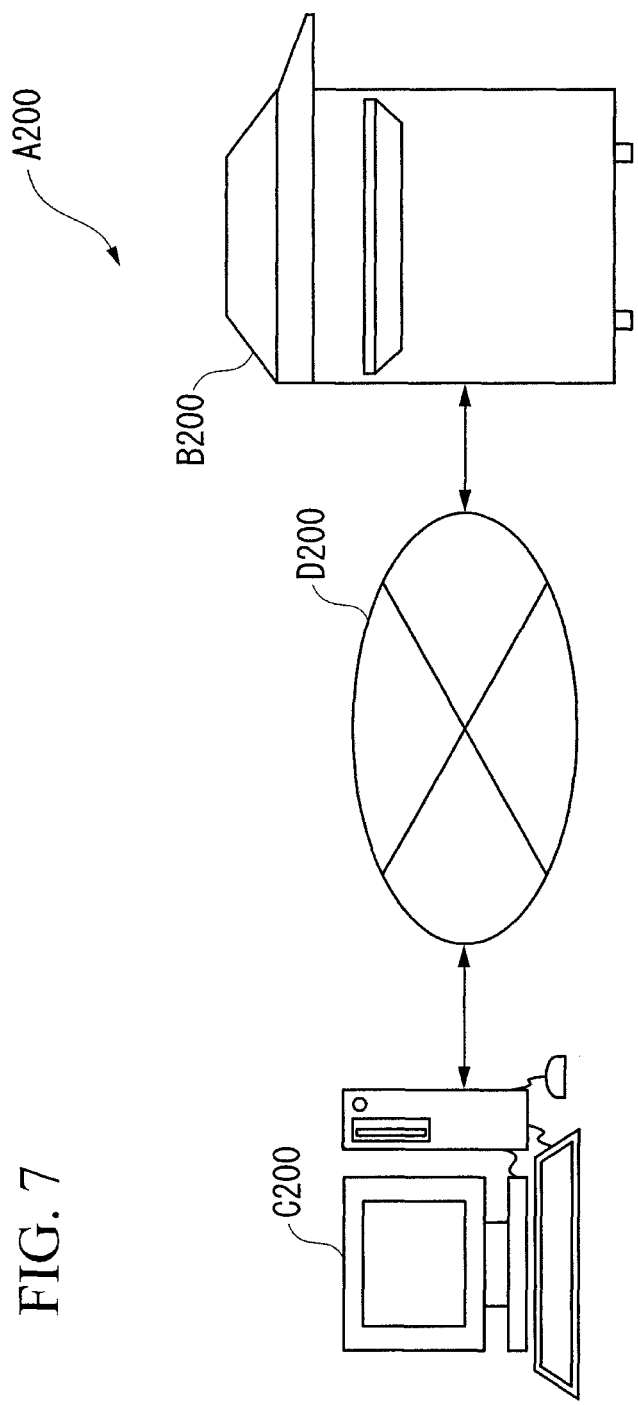
FIG. 7 is a system configuration diagram of an error management system A200 according to a third embodiment of the present invention.

As shown in FIG. 7, the error management system A200 includes a multifunction peripheral B200, a supervisory computer C200, and a public network D200.

The multifunction peripheral B200 performs a copying process based on instructions to make copies. In addition, the multifunction peripheral B200 performs a printing process based on instructions from a client computer to make printouts. When the multifunction peripheral B200 receives a facsimile from the FAX sending machine (not diagramed) via the public network D200, the multifunction peripheral B200 outputs the received transmission based on the image data of the facsimile. The multifunction peripheral B200 is also connected to the supervisory computer C200 through the public network D200. When an error occurs, the multifunction peripheral B200 transmits the error information to the supervisory computer C200 by sending an error notification email through the public network D200. The operations of the multifunction peripheral B200 are later described in detail.

Examples of the supervisory computer C200 include a desktop personal computer or a notebook personal computer. The supervisory computer C200 is connected to the multifunction peripheral B200 via the public network D200. The supervisory computer C200 receives from the multifunction peripheral B200 through the public network D200, the error notification email containing an attachment of the error information. When the supervisory computer C200 receives the error notification email from the multifunction peripheral B200, the personnel in charge of supervising the conditions of the multifunction peripheral B200 through the supervisory computer C200 recognizes that an error has occurred with respect to the multifunction peripheral B200.

Examples of the public network D200 include a public telephone network and the internet. The public network D200 connects the multifunction peripheral B200 and the supervisory computer C200. The public network D200 serves as a transmission path of the signal concerning the communication between the multifunction peripheral B200 and the supervisory computer C200. The transmission of the error notification email from the multifunction peripheral B200 to the supervisory computer C200 is made through a mail server (not diagramed) included in the public network D200.

Figure 8:
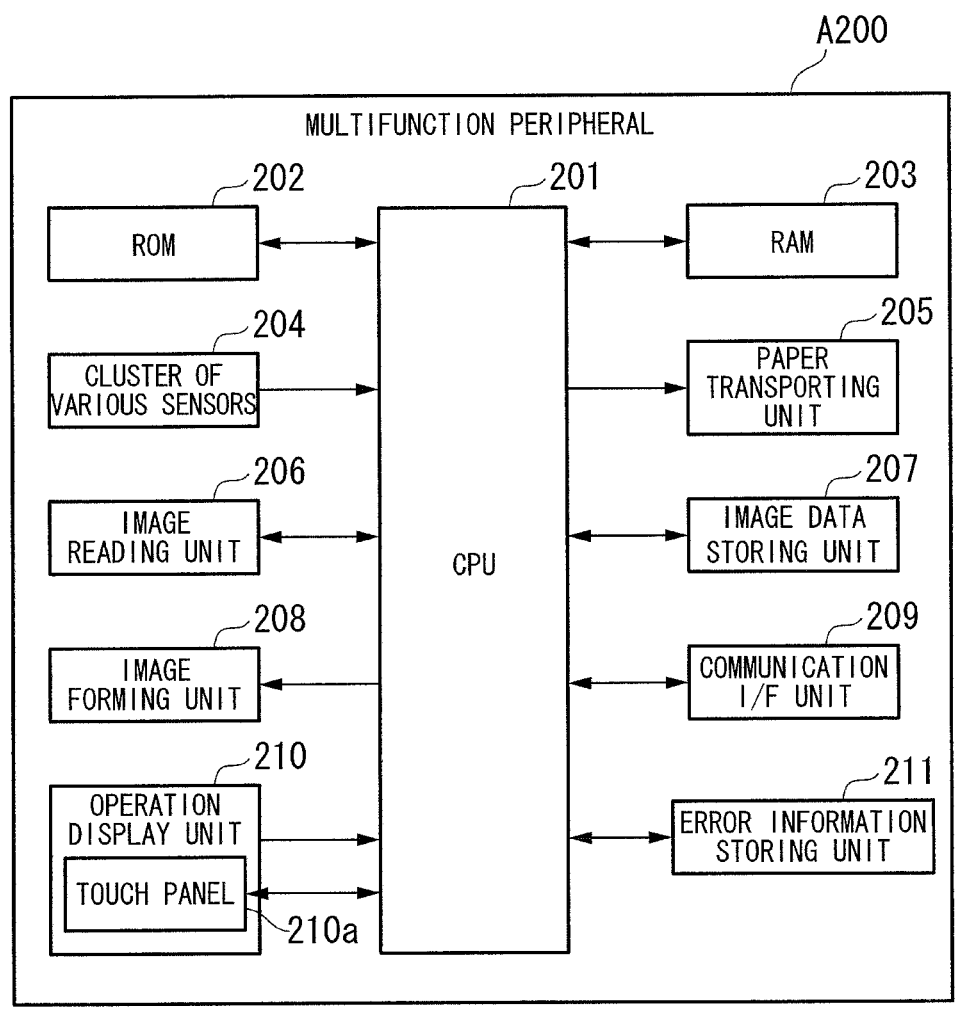
FIG. 8 is a functional block diagram of a multifunction peripheral B200 of the error management system A200 according to the above embodiment of the present invention.

Next, the functions and configuration of the multifunction peripheral B200 based on the error management system A200 according to the above embodiment are described with reference to FIG. 8.

The multifunction peripheral B200 includes a CPU (Central Processing Unit) 201, a ROM (Read Only Memory) 202, a RAM (Random Access Memory) 203, a cluster of various sensors 204, a paper transporting unit 205, an image reading unit 206, an image data storing unit 207, an image forming unit 208, a communication I/F unit 209, an operation display unit 210, and an error information storing unit 211.

The CPU 201 controls the overall operations of the multifunction peripheral B200 based on a control program stored in the ROM 202, draft image data stored in the image data storing unit 207, image data from a printer or a facsimile, various instructions inputted via the communication I/F unit 209 from a client computer (not diagramed) or a public network D200, and instructions inputted from the operation display unit 210. The details of the control processing performed by the CPU 201 will be described below as an explanation of the operation of the multifunction peripheral B200.

The ROM 202 is a nonvolatile memory that stores the control program executed by the CPU 201 and other data.

The RAM 203 is a volatile memory used as a working area in which data is temporarily stored when the CPU 201 performs various operations by executing the control program.

The cluster of various sensors 204 includes multiple sensors that are necessary for forming images, such as a printing paper outage detecting sensor, a printing paper jam detecting sensor, a printing paper position detection sensor, and a temperature sensor. The cluster of various sensors 204 outputs the various detected information to the CPU 201 as a detection signal.

The paper transporting unit 205 includes a first transporting roller that transports printing paper, stored in the paper tray, to the image forming unit 208; a motor for operating the first transporting roller; a second transporting roller that, after the image forming process has been completed, transports printing paper to a discharging tray (not diagramed); and a motor for operating the second transporting roller.

The image reading unit 206 includes, for example, an ADF (Automatic Draft Feeding Device), a CCD (Charge Coupled Device) sensor and the like. The image reading unit 206 makes the CCD sensor read the image of the draft supplied by the ADF. Then, the image reading unit 206 outputs the draft image data based on the draft image. The image reading unit 206 outputs the draft image data to the CPU 201. Meanwhile, the CPU 201 stores the draft image data to the image data storing unit 207.

An example of the image data storing unit 207 is flash memory. Under the command of the CPU 201, the image data storing unit 207 stores the draft image data, the print image data received by the communication I/F unit 209 from the client computer (not diagramed), and the facsimile image data received by the communication I/F unit 209 from the public network D200.

Based on the draft image data stored in the image data storing unit 207, the print image data, or the facsimile image data, the image forming unit 208 transcribes, under the control of the CPU 201, the image formed by the toner onto the printing paper that was transported from the paper transporting unit 205. In addition, the image forming unit 208 performs the fixing process of the image by using a fixing roller.

The communication I/F unit 209 connects to a client computer (not diagramed) and a public network D200. The communication I/F unit 209 transmits and receives various signals between the client computer and the public network D200.

The operation display unit 210 includes a start key, a stop key, a power source key, a numeric keypad (a number entering key), a touch panel 210a, a clear key, and other various operational keys. The operation display unit 210 outputs the operational instructions for each key to the CPU 201. Further, under the command of the CPU 201, the operation display unit 210 displays various screens on the touch panel 210a. A flash memory is an example of the error information storing unit 211. When various errors occur with respect to the multifunction peripheral B200, the error information storing unit 211 stores various error information under the control of the CPU 201. The personnel in charge of analyzing the abnormality uses this error information when he or she analyzes the error.

Next, the operations of the multifunction peripheral B200 according to the above embodiment of the present invention are described in detail with reference to FIG. 9.

First, a user who tries to copy drafts with the multifunction peripheral B200 prepares the copying settings such as copying magnification by manipulating the keys of the operation display unit 210. When the user completes preparing the copying settings, the user sets the draft to the ADF of the image reading unit 206. Then, the user starts the copying process of the multifunction peripheral B200 by pressing the start key of the operation display unit 210.

The CPU 201 determines whether or not the operation display unit 210 received instructions to start the copying process by the pressing of the start key (step S201). If the result of step S201 is NO, the operation display unit 210 has not received instructions to start the copying process. In this case, the CPU 201 waits until the operation display unit 210 receives instructions to start the copying process. If the result of step S201 is YES, the operation display unit 210 has received instructions to start the copying process. In this case, the CPU 201 makes the image reading unit 206 transport the draft placed in the ADF. At the same time, the CPU 201 makes the image reading unit 206 initiate the reading of the draft image from the draft (step S202).

After the CPU 201 makes the image reading unit 206 initiate the reading of the draft image from the draft in step S202, the CPU 201 makes the image reading unit 206 automatically adjust the ADF and the scanning function. Then, the CPU 201 determines whether or not the image reading unit 206 succeeded in automatically adjusting the ADF and the scanning function (step S203). If the result of step S203 is YES, the image reading unit 206 has succeeded in automatically adjusting the ADF and the scanning function. In this case, the CPU 201 makes the image reading unit 206 continue transporting the draft placed in the ADF and also continue reading the draft image from the draft (step S204).

When the CPU 201 determines that the result of step S203 is NO, the image reading unit 206 has not succeeded in automatically adjusting the ADF or the scanning function. In this case, the CPU 201 converts the display currently shown on the touch panel 210a (hereinafter referred to as the "display during copying") to an image file such as JPEG or GIF and the like. Then, the CPU 201 stores this image file into the error information storing unit 211 as the first error information (step S205). FIG. 9 presents an example of the display during copying shown on the touch panel 210a of the multifunction peripheral B200 according to the above embodiment of the present invention.

Figure 9:
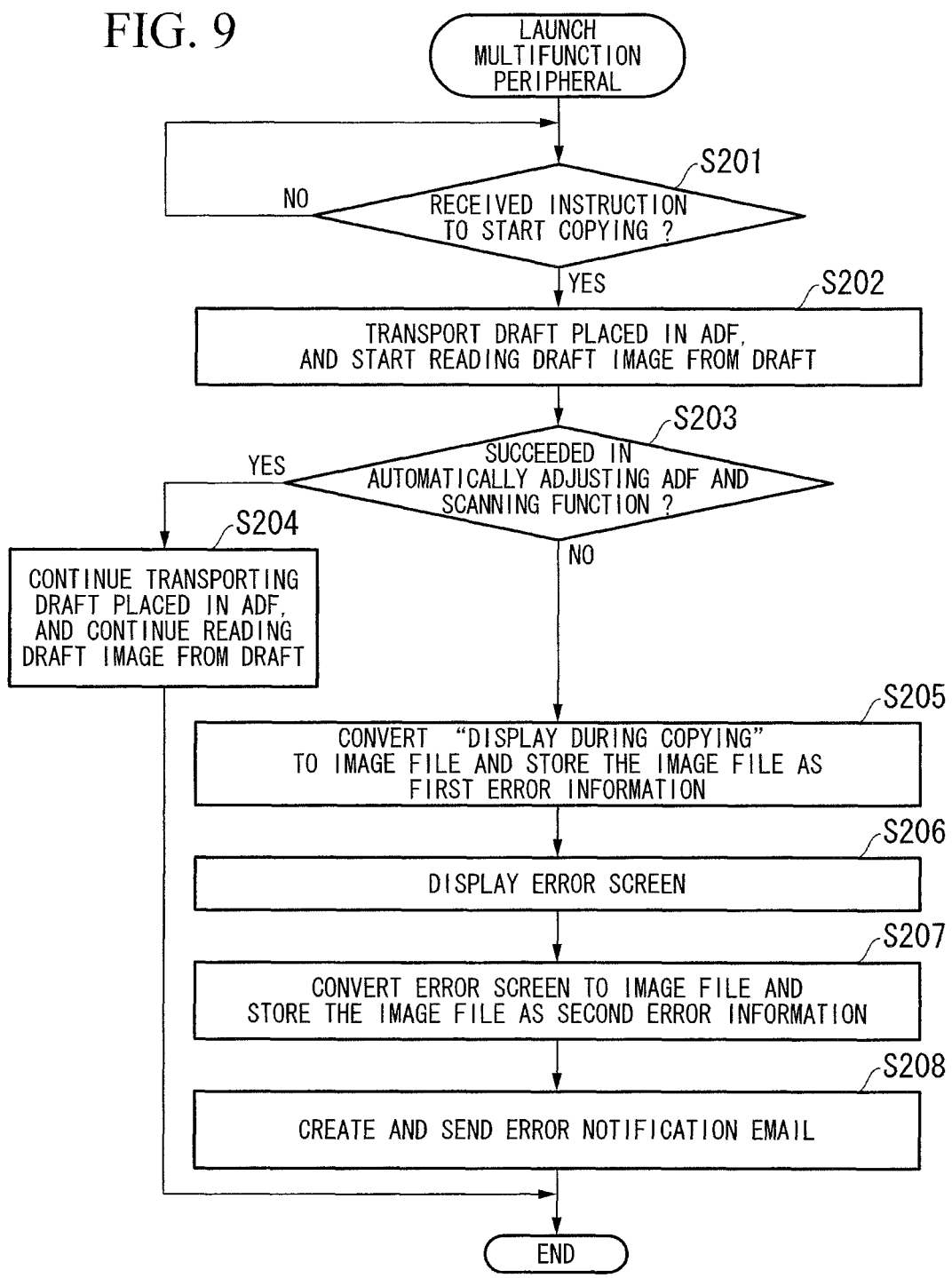
FIG. 9 is a flowchart showing an operation of the multifunction peripheral B200 of the error management system A200 according to the above embodiment of the present invention.

According to the multifunction peripheral B200, when the operation display unit 210 receives instructions to start the copying process by the pressing of the start key, the touch panel 210a shows the display during copying as presented in FIG. 9. The message, "Currently Copying," is shown on this display during copying, indicating that the multifunction peripheral B200 is performing the copying process. At the same time, various buttons for preparing the copying settings (hereinafter may be referred to as "setting buttons") are shown on the display during copying. Among these various setting buttons, the color of the button corresponding to the copying setting that is selected in the current copying process is inverted. Meanwhile, the color of the button corresponding to the copying setting that is not selected is gray. These gray buttons are indicated in FIG. 9 as the setting buttons drawn with dashed lines on the copying display.

Figure 10:
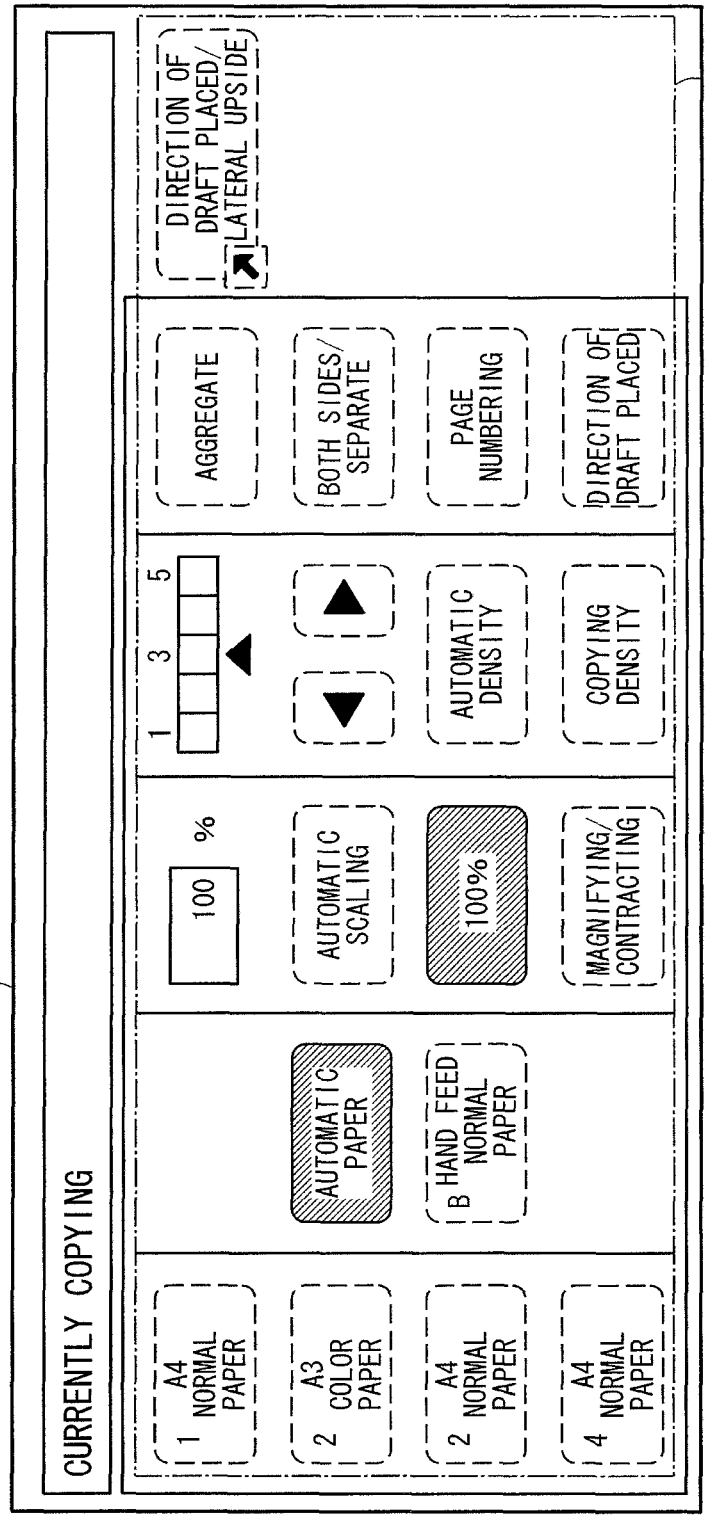
FIG. 10 is a diagram showing a screen displayed on a touch panel 210a of the multifunction peripheral B200 according to the above embodiment of the present invention while copying is performed.
Figure 11:
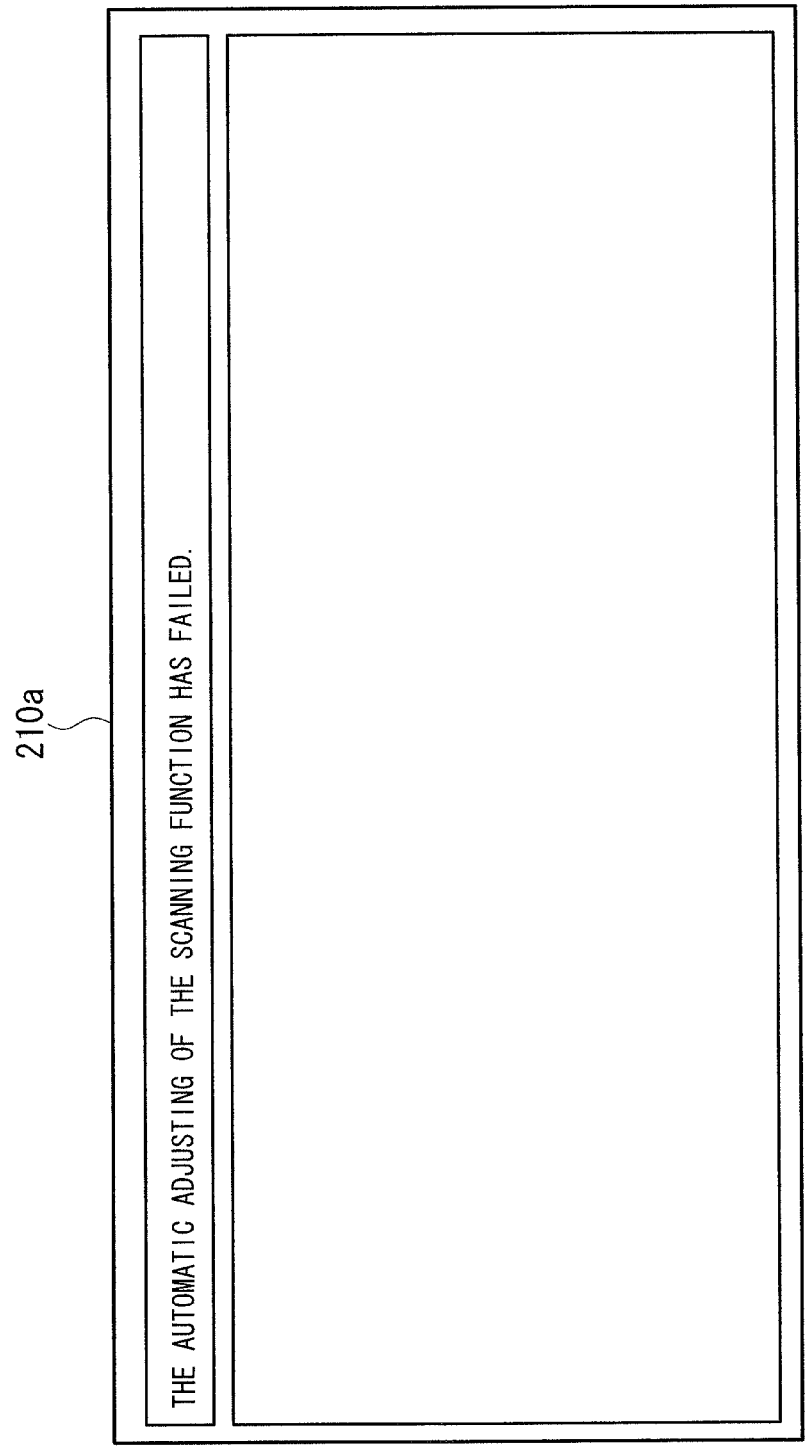
FIG. 11 is a diagram showing an error notification screen displayed on the touch panel 210a of the multifunction peripheral B200 according to the above embodiment of the present invention.

After step S205, the CPU 201 displays on the touch panel 210a, an error notification display showing an error message indicating that the image reading unit 206 failed to automatically adjust the ADF or the scanning function (step S206). In addition, the CPU 201 converts the error notification display shown on the touch panel 210a to an image file such as JPEG or GIF and the like. Then, the CPU 201 stores this image file to the error information storing unit 211 as the second error information (step S207). FIG. 10 presents an example of the error notification display shown on the touch panel 210a of the multifunction peripheral B200 according to the above embodiment of the present invention.

According to the multifunction peripheral B200, the first error information is stored in the error information storing unit 211 in step S205. Then, in step S206, the error notification display presented in FIG. 10 is shown on the touch panel 210a. For example, when the image reading unit 206 fails to automatically adjust the scanning function, the error notification display shows, as presented in FIG. 10, an error message "The Automatic Adjusting of the Scanning Function has Failed," indicating that the automatic adjusting of the scanning function did not succeed.

Further, after step S207, the CPU 201 creates an error notification email and attaches the first error information and the second error information stored in the error information storing unit 211. The recipient address of the error notification email is set to be the email address of the supervisory computer C200. The CPU 201 makes the communication I/F unit 209 send the error notification email to the supervisory computer C200 via the public network D200 (step S208). The email address of the supervisory computer C200 is registered in advance to the multifunction peripheral B200 as the recipient address of the error notification email in case the image reading unit 206 fails to automatically adjust the ADF or the scanning function. The registered email address of the supervisory computer C200 as the recipient address of the error notification mail is stored in the ROM 202.

As described above, based on the multifunction peripheral B200 of the error management system A200 according to the above embodiment of the present invention, when the operation display unit 210 receives instructions to start the copying process, the CPU 201 makes the image reading unit 206 transport the draft placed in the ADF. At the same time, the CPU 201 makes the image reading unit 206 start reading the draft image from the draft. The CPU 201 makes the image reading unit 206 automatically adjust the ADF and the scanning function. When the image reading unit 206 fails to automatically adjust the ADF or the scanning function, the CPU 201 determines that the automatic adjustment by the image reading unit 206 has failed. At this time, the CPU 201 converts the copying display shown on the touch panel 210a to an image file. The CPU 201 also stores this image file to the error information storing unit 211 as the first error information.

Then, the CPU 201 converts the error notification display shown on the touch panel 210a to an image file. The CPU 201 also stores this image file to the error information storing unit 211 as the second error information. Then, the CPU 201 creates an error notification email and attaches the first error information and the second error information. The recipient address of the error notification email is set to be the email address of the supervisory computer C200. The CPU 201 makes the communication I/F unit 209 send the error notification email to the supervisory computer C200 via the public network D200.

In this way, the electronic device according to the above embodiment of the present invention saves the image files of the display during copying at the time an error occurred as the first error information and the error notification display shown immediately thereafter as the second error information. In addition, the electronic device according to the above embodiment of the present invention sends an error notification email to the supervisory computer C200. The first error information and the second error information are attached to the error notification email. Thus, the personnel in charge of supervising the conditions of the multifunction peripheral B200 by using the supervisory computer C200 can immediately recognize that an error has occurred with respect to the multifunction peripheral B200. In addition, the supervising personnel can promptly analyze the error based on the first error information and the second error information attached to the error notification email. As a result, the supervising personnel can start responding to the error more quickly.

Heretofore, the third embodiment of the present invention was described. However, the present invention is not limited by the above embodiment. For example, the following modification can be made.

Based on the above embodiment, when the CPU 201 determines after the copying process has started that the image reading unit 206 failed to automatically adjust the ADF or the scanning function, the CPU 201 converts to image files, the copying display shown at the time the determination was made and the error notification display later shown on the touch panel 210a. The CPU 201 then saves these image files to the error information storing unit 211 as the first error information and the second error information. However, the present invention is not limited by the above embodiment.

For example, when the CPU 201 determines after the copying process has started that an error like an image forming overrun has occurred in the image forming unit 208, the CPU 201 may save to the error information recording unit 211, the image files of the display shown on the touch panel 210a at the time the error occurred and the error notification display later shown on the touch panel 210a. In other words, the saving of the first error information and the second error information is not limited to the instance in which the error has occurred in the image reading unit 206 during the copying process.

In addition, the error information storing unit 211 can store the first error information and the second error information when an error occurs during processes other than copying such as during the printing process or the facsimile sending and receiving process performed by the multifunction peripheral B200. Furthermore, the above embodiment can also be applied to devices other than an image forming device, such as a personal computer, a handheld device, and various household electrical appliances. Moreover, the above embodiment can be applied to a manufacturing device of various products in a factory so that, when an error occurs, the manufacturing device sends an error notification email to the supervising computer C200.

Based on the above embodiment, when the image reading unit 206 fails to automatically adjust the ADF or the scanning function of the image reading unit 206, the CPU 201 attached an image file of the display during copying as the first error information and an image file of the error notification display as the second error information to an error notification email. The CPU 201 then transmitted the error notification email to the supervisory computer C200. However, the present invention is not limited by the above embodiment.

For example, the CPU 201 can attach, not only the image file of the display shown on the touch panel 210a, but also a log file recording the details of the operations and results of various functions of the multifunction peripheral B200 to the error notification email. The CPU 201 can then make the communication I/F unit 209 send this error notification email to the supervisory computer C200.

Further, in addition to attaching the first error information and the second error information, the CPU 201 can create an error notification email noting the seriousness of the error indicating whether or not the error should be dealt with immediately. The CPU 201 can then make the communication I/F unit 209 transmit the error notification email to the supervisory computer C200.

Based on the above embodiment, the multifunction peripheral B200 sent out an error notification email attached with the first error information and the second error information. In addition, the supervisory computer C200 received the error notification email attached with the first error information and the second error information. However, the present invention is not limited to the above configuration.

For example, the error management system A200 can further include an error information accumulation server connected with the public network D200. When the image reading unit 206 fails to automatically adjust the ADF or the scanning function of the image reading unit 206, the CPU 201 of the multifunction peripheral B200 can transmit to the error information accumulation server, a request to store the error information including the first error information and the second error information. In addition, the CPU 201 can transmit a request to the error information accumulation server, urging the error information accumulation server to send an error notification email to the supervisory computer C200.

When the error information accumulation server receives the error information storing request and the error notification email sending request, the error information accumulation server stores the first error information and the second error information. Then, the error information accumulation server sends to the supervisory computer C200, an error notification email indicating where the first error information and the second error information are located (for example, the URL (Uniform Resource Locator)). Thus, the personnel in charge of supervising the error information by using the supervisory computer C200 can obtain the first error information and the second error information by accessing the location indicated in the error notification email.

In this way, the error information accumulation server communicates with the multifunction peripheral B200 and the supervisory computer C200. By adding this error information accumulation server to the error management system A200, when the supervisory computer C200 is, for example, used for a purpose other than to supervise the conditions of the multifunction peripheral B200, the first error information and the second error information need not be saved. As a result, the supervisory computer C200 will be less burdened. In addition, it is possible to prevent a decline in the processing speed of processes performed for other purposes.

Further, when the multifunction peripheral B200 sends an error information recording request to the error information accumulation server, and the error information accumulation server receives this error information recording request, the error information accumulation server may store the error information contained in the error information storing request. The error information accumulation server may also transmit to the multifunction peripheral B200, an error information storing response containing information on the location at which the error information is stored. Based on the error information storing response, the multifunction peripheral B200 may then send to the supervisory computer C200, an error notification email indicating the location at which the error information is stored.

Based on the above embodiment, when the CPU 201 determines that the image reading unit 206 failed to automatically adjust the ADF or the scanning function of the image reading unit 206, the display during copying and the error notification display are converted to image files. The CPU 201 stores the image files to the error information storing unit 211 as the first error information and the second error information. The CPU 201 also sends to the supervisory computer C200, an error notification email to which the first error information and the second error information are attached. However, the present invention is not limited by the above embodiment.

The type of the error corresponding to the error notification email sent to the supervisory computer C200 may be registered by the user to the multifunction peripheral B200. When an error of the registered type occurs with respect to the multifunction peripheral B200, the multifunction peripheral B200 may transmit an error notification email to the supervisory computer C200.

Based on the above embodiment, when the CPU 201 determines that the image reading unit 206 failed to automatically adjust the ADF or the scanning function of the image reading unit 206, the display during copying and the error notification display are converted to image files. The CPU 201 stores the image files to the error information storing unit 211 as the first error information and the second error information. The CPU 201 also sends to the supervisory computer C200, an error notification email to which the first error information and the second error information are attached. However, the present invention is not limited by the above embodiment.

The error notification email need not be sent solely to the supervisory computer C200. According to the type of the error, it is possible to change the recipient address of the error notification email sent by the multifunction peripheral B200. For example, when an error occurs such that the hardware must be exchanged or the software must be updated after the error has been analyzed, the error notification may be send to the supervisory computer C200. Meanwhile, when an error occurs because of an abnormality in the equipment of the multifunction peripheral B200, such as a paper outage or a toner shortage, the error notification email may be sent to the equipment management computer used by the personnel in charge of supplying the materials.

Hereunder, a fourth embodiment of the present invention is described with reference to FIGS. 12, 13, 14, 15, 16, and 17. The above embodiment concerns a multifunction peripheral equipped with a copying feature, a printing feature, and a facsimile sending/receiving feature, the multifunction peripheral being a type of an image forming device.

Figure 12:
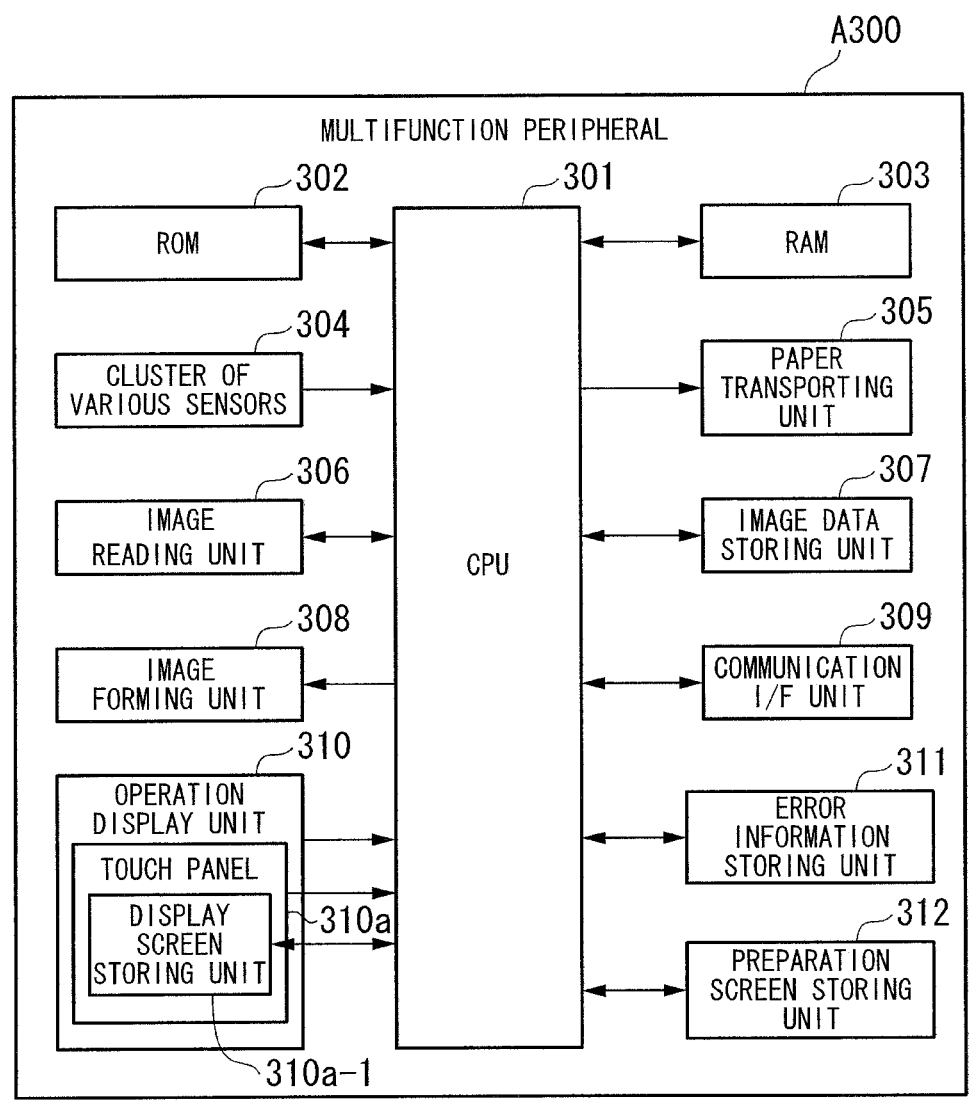
FIG. 12 is a functional block diagram of a multifunction peripheral A300 according to a fourth embodiment of the present invention.

First, the functions and configurations of a multifunction peripheral A300 are described with reference to FIG. 12.

The multifunction peripheral A300 includes a CPU (Central Processing Unit) 301, a ROM (Read Only Memory) 302, a RAM (Random Access Memory) 303, a cluster of various sensors 304, a paper transporting unit 305, an image reading unit 306, an image data storing unit 307, an image forming unit 308, a communication I/F unit 309, an operation display unit 310, an error information storing unit 311, and a preparation screen storing unit 312.

The CPU 301 controls the overall operations of the multifunction peripheral A300 based on a control program stored in the ROM 302, various signals detected from the cluster of various sensors 304, draft image data stored in the image data storing unit 307, image data from a printer or a facsimile, various instructions inputted via the communication I/F unit 309 from a client computer (not diagramed) or a public network (not diagramed), and instructions inputted from the operation display unit 310. The details of the control processing performed by the CPU 301 will be described below as an explanation of the operation of the multifunction peripheral A300.

The ROM 302 is a nonvolatile memory that stores the control program executed by the CPU 301 and other data.

The RAM 303 is a volatile memory used as a working area in which data is temporarily stored when the CPU 301 performs various operations by executing the control program.

The cluster of various sensors 304 include multiple sensors that are necessary for forming images, such as a printing paper outage detecting sensor, a printing paper jam detecting sensor, a printing paper position detection sensor, and a temperature sensor. The cluster of various sensors 304 outputs the various detected information to the CPU 301 as a detection signal.

The paper transporting unit 305 includes a first transporting roller that transports printing paper, stored in the paper tray, to the image forming unit 308; a motor for operating the first transporting roller; a second transporting roller that, after the image forming process has been completed, transports printing paper to a discharging tray (not diagramed); and a motor for operating the second transporting roller.

The image reading unit 306 includes, for example, an ADF (Automatic Draft Feeding Device), a CCD (Charge Coupled Device) sensor and the like. The image reading unit 306 makes the CCD sensor read the image of the draft supplied by the ADF. Then, the image reading unit 306 outputs the draft image data based on the draft image. The image reading unit 306 outputs the draft image data to the CPU 301. Meanwhile, the CPU 301 stores the draft image data to the image data storing unit 307.

Examples of the image data storing unit 307 include flash memory or hard disc. Under the command of the CPU 301, the image data storing unit 307 stores the draft image data, the print image data received by the communication I/F unit 309 from the client computer (not diagramed), and the facsimile image data received by the communication I/F unit 309 from the public network (not diagramed).

Based on the draft image data stored in the image data storing unit 307, the print image data, or the facsimile image data, the image forming unit 308 transcribes, under the control of the CPU 301, the image formed by the toner onto the printing paper that was transported from the paper transporting unit 305. In addition, the image forming unit 308 performs the fixing process of the image by using a fixing roller.

The communication I/F unit 309 connects to an external client computer and a public network. The communication I/F unit 309 transmits and receives various signals between the client computer and the public network.

The operation display unit 310 includes a copying screen displaying key, a printing screen displaying key, a scanning screen displaying key, a facsimile screen displaying key, a start key, a stop/clear key, a power source key, a numeric keypad (a number entering key), a touch panel 310a, and other various operational keys. The operation display unit 310 outputs the operational instructions for each key to the CPU 301. Further, under the command of the CPU 301, the operation display unit 310 displays various screens on the touch panel 310a. In addition, tie touch panel 310a includes a display screen storing unit 310a-1. When the display screen storing unit 310a-1 stores the screen data of a specific screen based on the command of the CPU 301, the touch panel 310a updates the display to a display based on the screen data stored by the display screen storing unit 310a-1. The copying screen displaying key, tie printing screen displaying key, the scanning screen displaying key, and the facsimile screen displaying key are used to update the screen to a screen corresponding to the respective functions.

Examples of the error information storing unit 311 include flash memory or hard disc. When various types of errors occur with respect to the multifunction peripheral A300, the error information storing unit 311, controlled by the CPU 301, stores various types of error information used by the personnel in charge of analyzing the abnormality to analyze the error.

An example of the preparation screen storing unit 312 is an SDRAM (Synchronous Dynamic Random Access Memory). Under the control of the CPU 301, the preparation screen storing unit 312 stores image data of the display that will be shown next on the touch panel 310a and the display corresponding to functions other than what is being shown on the touch panel 310a.

For example, when the touch panel 310a is showing a display concerning the copying function, the preparation screen storing unit 312 stores displays concerning functions other than copying such as printing, scanning, and faxing. Based on the display updating instructions received by the operation display unit 310, the CPU 301 stores the image data of various functions stored by the preparation screen storing unit 312 to the display screen storing unit 310a-1 included in the touch panel 310a. Furthermore, the CPU 301 makes the touch panel 310a update the display.

Figure 13:
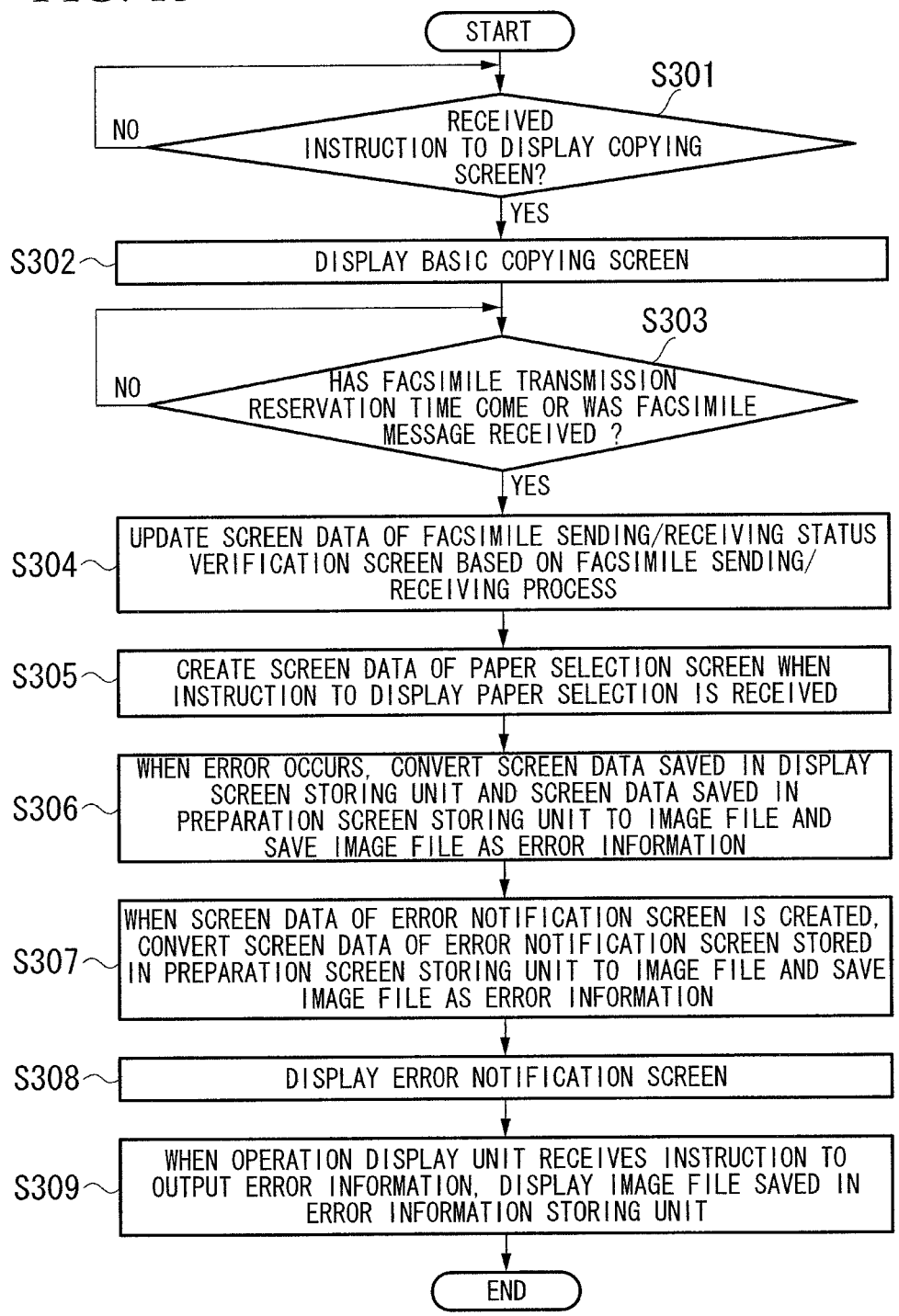
FIG. 13 is a flowchart showing an operation of the multifunction peripheral A300 according to the above embodiment of the present invention.

Next, the operations of the multifunction peripheral A300 according to the above embodiment of the present invention are described in detail with reference to FIG. 13.

The CPU 301 determines whether or not the operation display unit 310 has received instructions to display the copying screen by the pressing of the copying screen displaying key (step S301). If the result of step S301 is NO, the operation display unit 310 has not received instructions to display the copying screen. In this case, the CPU 301 waits until the operation display unit 310 receives instructions to display the copying screen. If the result of step S301 is YES, the operation display unit 310 has received instructions to display the copying screen. In this case, the CPU 301 makes the display screen storing unit 310a-1 store the screen data of the basic copying screen. Furthermore, based on this screen data, the CPU 301 displays the basic copying screen to the touch panel 310a (step S302).

Figure 14:
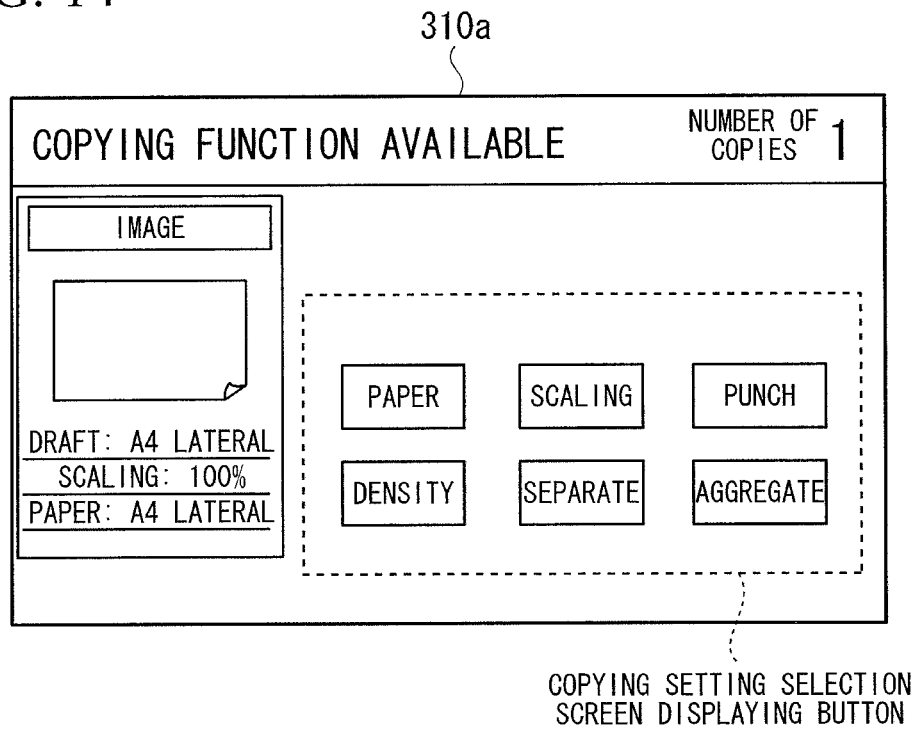
FIG. 14 is a diagram showing a basic copying screen of the multifunction peripheral A300 according to the above embodiment of the present invention.
Figure 15:
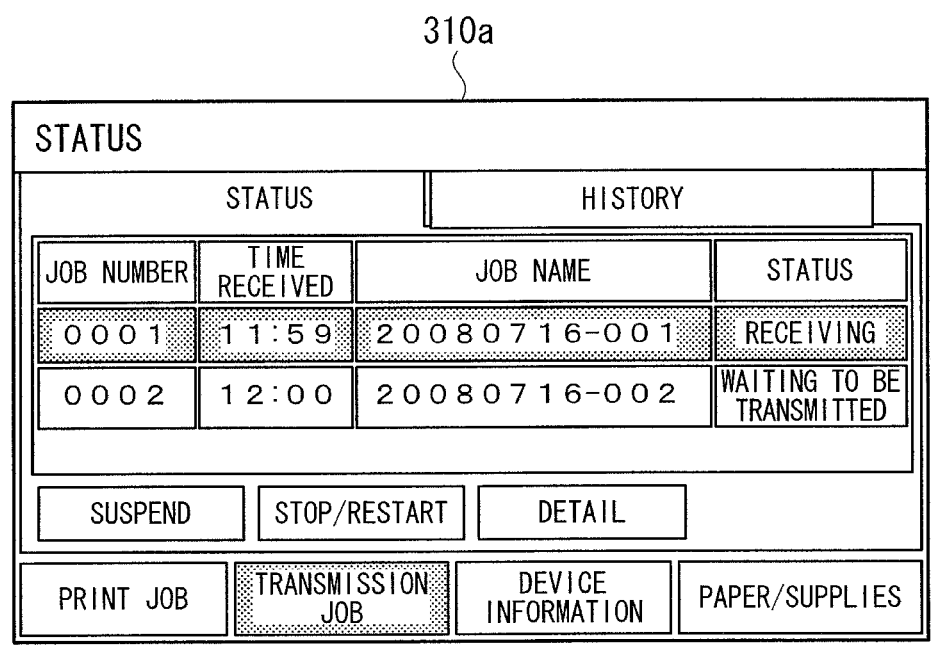
FIG. 15 is a diagram showing a send/receive status verification screen of the multifunction peripheral A300 according to the above embodiment of the present invention.
Figure 16:
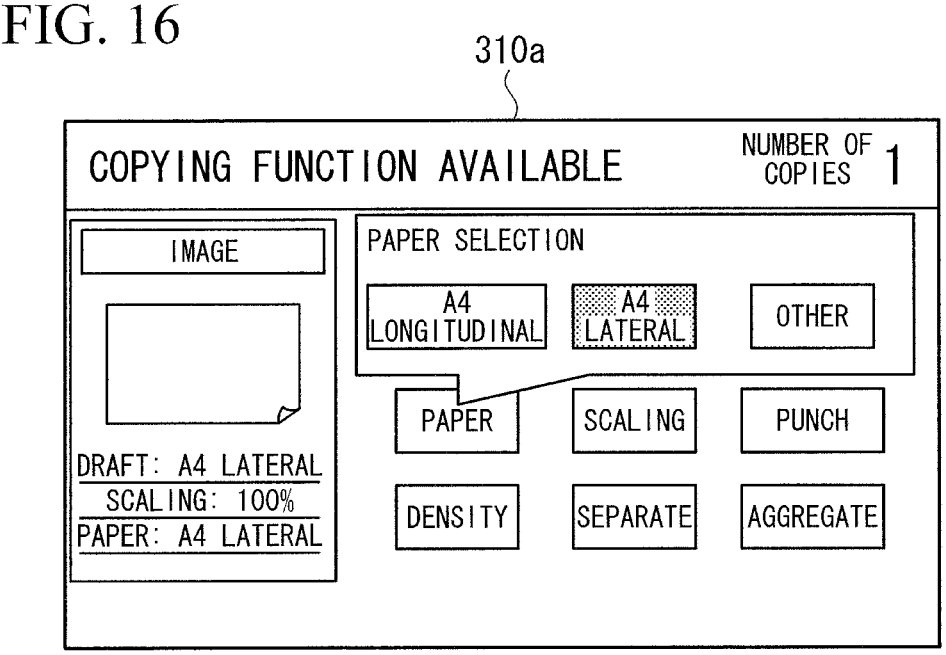
FIG. 16 is a diagram showing a paper selection screen of the multifunction peripheral A300 according to the above embodiment of the present invention.
Figure 17:
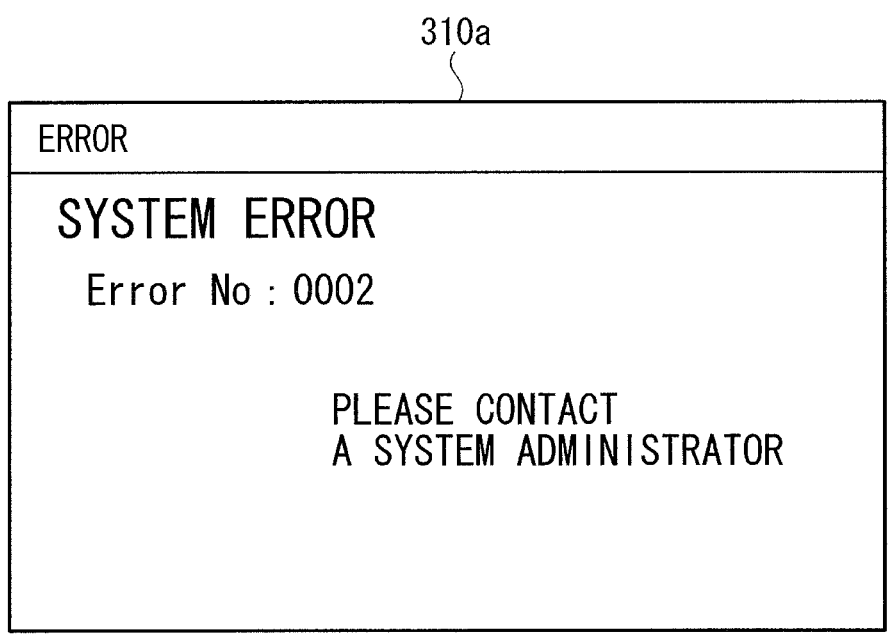
FIG. 17 is a diagram showing an error notification screen of the multifunction peripheral A300 according to the above embodiment of the present invention.

The basic copying screen is the main screen concerning the copying function of the multifunction peripheral A300. As shown in FIG. 14, the current copying settings are displayed in the left side of the basic copying screen. At the same time, a button used to display the screen for selecting the various copying settings (hereinafter may be referred to as the "copying setting selection screen displaying button") is shown on the basic copying screen.

After step S302, the CPU 301 determines whether the reservation time for sending a facsimile message (hereinafter may be referred to as the "facsimile sending reservation time") has come or whether a facsimile message was received based on the signal received by the communication I/F unit 309 (step S303). If the result of step S303 is NO, the facsimile sending reservation time has not come yet, and no facsimile message has been received. In this case, the CPU 301 waits until the facsimile sending reservation time comes or a facsimile message is received. If the result of the step S303 is YES, the facsimile sending reservation time has come or a facsimile message has been received. In this case, the CPU 301 makes the communication I/F unit 309 start the facsimile sending/receiving process in the background. Based on the facsimile sending/receiving process, the CPU 301 updates the screen data of the facsimile sending/receiving status verification screen stored by the preparation screen storing unit (step S304).

The facsimile sending/receiving status verification screen shows the current sending/receiving statuses of each facsimile job. The facsimile sending/receiving status verification screen presented in FIG. 15 indicates that a facsimile message concerning the facsimile job "20080716-001" is being received.

After step S304, when the touch panel 310a receives instructions to display the screen for selecting the printing paper (hereinafter may be referred to as the "paper selection screen displaying instructions") by the pressing of the "paper" button on the basic copying screen, the preparation screen storing unit 312 creates screen data of the paper selection screen (step S305). The paper selection screen makes the user select the settings of the printing paper used for copying, such as the size of the printing paper and the direction in which the printing will be performed. According to the paper selection screen presented in FIG. 16, the "A4 Lateral" button is inverted, indicating that the size of the printing paper is A4, and that the printing is performed in the lateral direction of the printing paper. This shows that "A4 Lateral" is chosen as the default printing setting.

After the preparation screen storing unit 312 finishes creating the screen data of the paper selection screen in step S305, and immediately before the screen data of the paper selection screen is forwarded from the preparation screen storing unit 312 to the display screen storing unit 310a-1, the CPU 301 may determine that an error concerning the facsimile transmission/reception occurred because the dial tone of the facsimile was not detected. In this case, the CPU 301 converts into image files, the screen data of the basic copying screen stored in the display screen storing unit 310a-1 and the screen data of the facsimile sending/receiving status verification screen and the paper selection screen stored in the preparation screen storing unit 312. Examples of the format of the image files include JPEG and GIF. Then, the CPU 301 stores the image files of the basic copying machine, the facsimile sending/receiving status verification screen, and the paper selection screen to the error information storing unit 311 as error information (step S306). If the image data of the facsimile sending/receiving status verification is being updated when the CPU 301 determines that an error has occurred, the CPU 301 stops the updating of the image data. Then, the CPU 301 converts the image data into an image file immediately before the image data is updated. Then, the CPU 301 stores this image file to the error information storing unit 311.

After step S306, when the preparation screen storing unit 12 finishes creating the screen data of the error notification screen, the CPU 301 converts the screen data of the error notification screen stored in the preparation screen storing unit to an image file. The CPU 301 stores this image file to the error information storing unit 311 as error information (step S307). The CPU 301 forwards the screen data of the error notification screen from the preparation screen storing unit 312 to the display screen storing unit 310a-1. Based on the screen data stored in the display screen storing unit 310a-1, the CPU 301 displays the error notification screen on the touch panel 310a (step S308). The error notification screen indicates that an error has occurred concerning the transmission and reception of the facsimile message. The error notification screen shows an error number indicating the type of error that occurred.

Incidentally, the CPU 301 stores into the error information storing unit 311, the screen data of the screen currently displayed on the touch panel 310a, in other words the screen data stored by the display screen storing unit 310a-1, separately from the screen data stored by the preparation screen storing unit. For example, in order to separate the screen data of the basic copying screen stored by the display screen storing unit 310a-1 from the facsimile sending/receiving status verification screen, the paper selection screen, and the error notification screen stored in the preparation screen storing unit, the CPU 301 adds an identifier when storing data into the error information storing unit 311.

After step S308, when the operation display unit 310 receives instructions to output the error information by the manipulation of a key, the CPU 301 creates separate titles for the screen displayed on the touch panel 310a and the screen stored in the preparation screen storing unit 312, so that the two screens can be distinguished. Then, the CPU 301 displays the image files of the basic copying screen stored in the error information storing unit 311, the facsimile sending/receiving status verification screen, the paper selection screen, and the error notification screen on the touch panel 310a (step S309).

As described above, based on the multifunction peripheral A300 according to the above embodiment, when the CPU 301 determines that an error has occurred, the CPU 301 converts to image files, not only the screen data of the basic copying screen displayed on the touch panel 310a, but also the screen data of the facsimile sending/receiving status verification screen and the paper selection screen stored in the preparation screen storing unit 312. In addition, the CPU 301 stores this image file to the error information storing unit 311 as error information. After the CPU 301 stores the image file of the basic copying screen, the facsimile sending/receiving status verification screen, and the paper selection screen to the error information storing unit 311, the CPU 301 also converts to an image file, the screen data of the error notification screen created by the preparation screen storing unit 312. The CPU 301 then stores the data to the error information storing unit 311 as error information.

In this way, not only the screen displayed on the touch panel 310a, but also the screen stored by the preparation screen storing unit 312 is stored as error information. Thus, the personnel in charge of analyzing the abnormality can comprehend not only the status of the function being displayed on the touch panel 310a at that time, but also the operations and conditions of the functions that are being performed in the background. Therefore, even if an error occurs due to a combination of various factors, the personnel can identify the cause of the error in an efficient manner.

Heretofore, the fourth embodiment of the present invention was described. However, the present invention is not limited by the above embodiment. For example, the following modification can be made.

The above embodiment concerned applying the electronic device according to an aspect of the present invention to a multifunction peripheral which is a type of an image forming device. However, the electronic device according to an aspect of the present invention can also be applied to other, various kinds of electronic devices such as a personal computer and a handheld device, as long as the electronic device has a preparation screen storing unit used to create the screen that will be displayed in the future, in addition to the display screen storing unit which stores the screen that is presently being displayed.

Based on the above embodiment, when the CPU 301 determines that an error has occurred, the CPU 301 converts to image files, the screen data of the basic copying screen displayed on the touch panel 310a in addition to the screen data of the facsimile sending/receiving status verification screen and the paper selection screen stored in the preparation screen storing unit 312. Then, the CPU 301 stores these screen files to the error information storing unit 311 as error information. Next, the CPU 301 also converts to an image file, the screen data of the error notification screen created by the preparation screen storing unit 312. Further, the CPU 301 also stores this image data to the error information storing unit 311 as error information. However, the present invention is not limited to the above embodiment.

The contents displayed on the basic copying screen, the facsimile sending/receiving status verification screen, and the paper selection screen change according to the operations made by the user or the operations and conditions of the various functions. Therefore, the image file based on the screen data stored in the display screen storing unit and the preparation screen storing unit 312 needs to be stored in the error information storing unit 311. However, if the contents displayed on a screen do not change (for example, the error notification screen), the error information concerning the screen can be stored not as an image file, but instead as an identifier corresponding to the screen (for example, a screen ID) in the error information storing unit 311. By storing the identifier of the screen to the error information storing unit 311, it is possible to maintain enough space in the error information storing unit 311, compared to the case where an image file of the screen data is stored.

Hereunder, a fifth embodiment of the present invention is described with reference to FIGS. 18, 19, 20, 21, 22, and 23. The above embodiment concerns a multifunction peripheral equipped with a copying feature, a printing feature, and a facsimile sending/receiving feature, the multifunction peripheral being a type of an image forming device.

Figure 18:
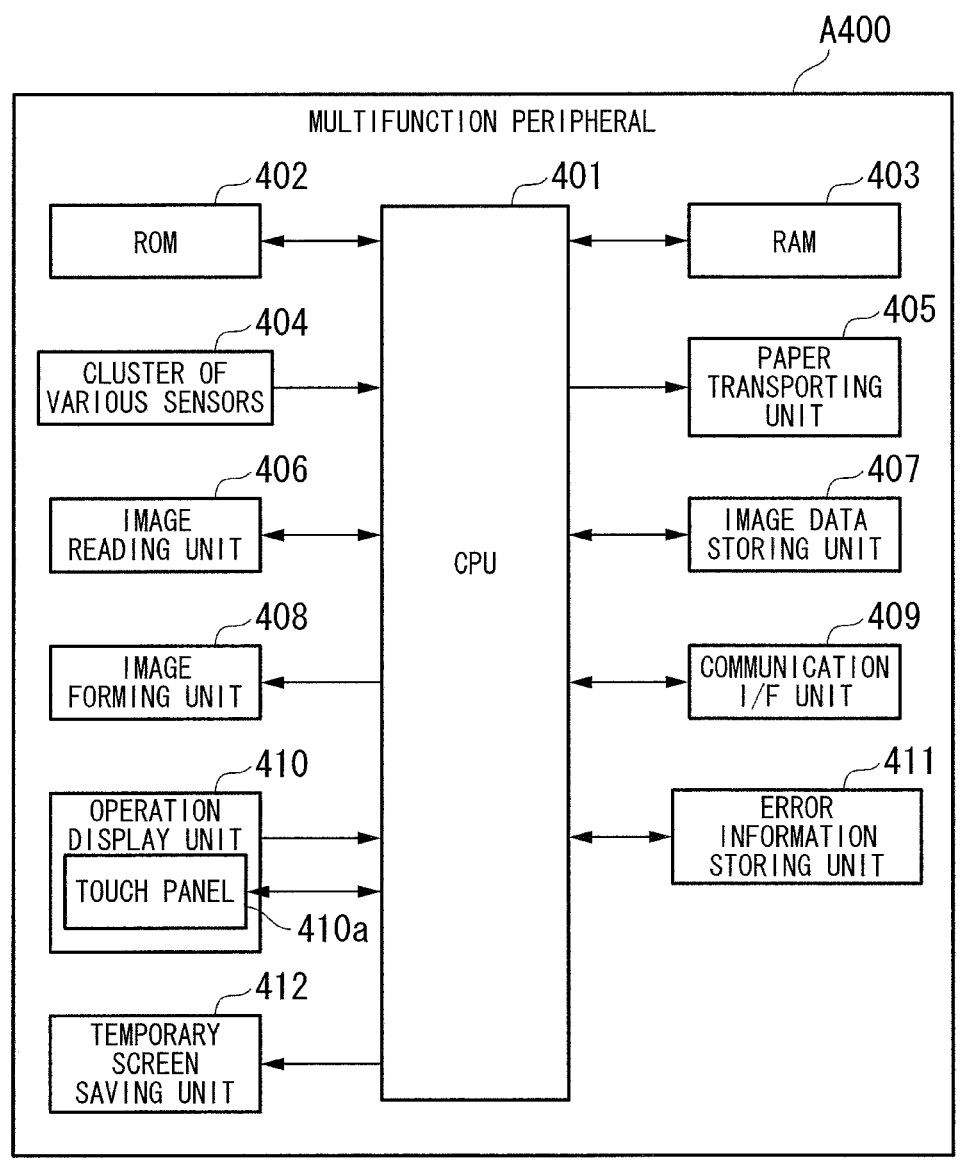
FIG. 18 is a functional block diagram of a multifunction peripheral A400 according to a fifth embodiment of the present invention.

First, the functions and configurations of a multifunction peripheral A400 are described with reference to FIG. 18.

The multifunction peripheral A400 includes a CPU (Central Processing Unit) 401, a ROM (Read Only Memory) 402, a RAM (Random Access Memory) 403, a cluster of various sensors 404, a paper transporting unit 405, an image reading unit 406, an image data storing unit 407, an image forming unit 408, a communication I/F unit 409, an operation display unit 410, an error information storing unit 411, and temporary screen saving unit 412.

The CPU 401 controls the overall operations of the multifunction peripheral A400 based on a control program stored in the ROM 402, various signals detected from the cluster of various sensors 404, draft image data stored in the image data storing unit 407, image data from a printer or a facsimile, various instructions inputted via the communication I/F unit 409 from a client computer (not diagramed) or a public network (not diagramed), and instructions inputted from the operation display unit 410. The details of the control processing performed by the CPU 401 will be described below as an explanation of the operation of the multifunction peripheral A400.

The ROM 402 is a nonvolatile memory that stores the control program executed by the CPU 401 and other data.

The RAM 403 is a volatile memory used as a working area in which data is temporarily stored when the CPU 401 performs various operations by executing the control program.

The cluster of various sensors 404 includes multiple sensors that are necessary for forming images, such as a printing paper outage detecting sensor, a printing paper jam detecting sensor, a printing paper position detection sensor, and a temperature sensor. The cluster of various sensors 404 outputs the various detected information to the CPU 401 as a detection signal.

The paper transporting unit 405 includes a first transporting roller that transports printing paper, stored in the paper tray, to the image forming unit 408; a motor for operating the first transporting roller; a second transporting roller that, after the image forming process has been completed, transports printing paper to a discharging tray (not diagramed); and a motor for operating the second transporting roller.

The image reading unit 406 includes, for example, an ADF (Automatic Draft Feeding Device), a CCD (Charge Coupled Device) sensor and the like. The image reading unit 406 makes the CCD sensor read the image of the draft supplied by the ADF. Then, the image reading unit 406 outputs the draft image data based on the draft image. The image reading unit 406 outputs the draft image data to the CPU 401. Meanwhile, the CPU 401 stores the draft image data to the image data storing unit 407.

Examples of the image data storing unit 407 include flash memory or hard disc. Under the command of the CPU 401, the image data storing unit 407 stores the draft image data, the print image data received by the communication I/F unit 409 from the client computer (not diagramed), and the facsimile image data received by the communication I/F unit 409 from the public network (not diagramed).

Based on the draft image data stored in the image data storing unit 407, the print image data, or the facsimile image data, the image forming unit 408 transcribes, under the control of the CPU 401, the image formed by the toner onto the printing paper that was transported from the paper transporting unit 405. In addition, the image forming unit 408 performs the fixing process of the image by using a fixing roller.

The communication I/F unit 409 connects to a client computer and a public network. The communication I/F unit 409 transmits and receives various signals between the client computer and the public network.

The operation display unit 410 includes a copying screen displaying key, a printing screen displaying key, a scanning screen displaying key, a facsimile screen displaying key, a start key, a stop/clear key, a power source key, a numeric keypad (a number entering key), a touch panel 410a, and other various operational keys. The operation display unit 410 outputs the operational instructions for each key to the CPU 401. Further, under the command of the CPU 401, the operation display unit 410 displays various screens on the touch panel 410a.

An example of the error information storing unit 411 is a flash memory. When various types of errors occur with respect to the multifunction peripheral A400 the error information storing unit 411, controlled by the CPU 301, stores various types of error information used by the personnel in charge of analyzing the abnormality to analyze the error.

Examples of the temporary screen saving unit 412 include volatile memory that temporarily saves data. Under the control of the CPU, the temporary screen saving unit 412 temporarily saves the screen data of a certain screen.

Figure 19:
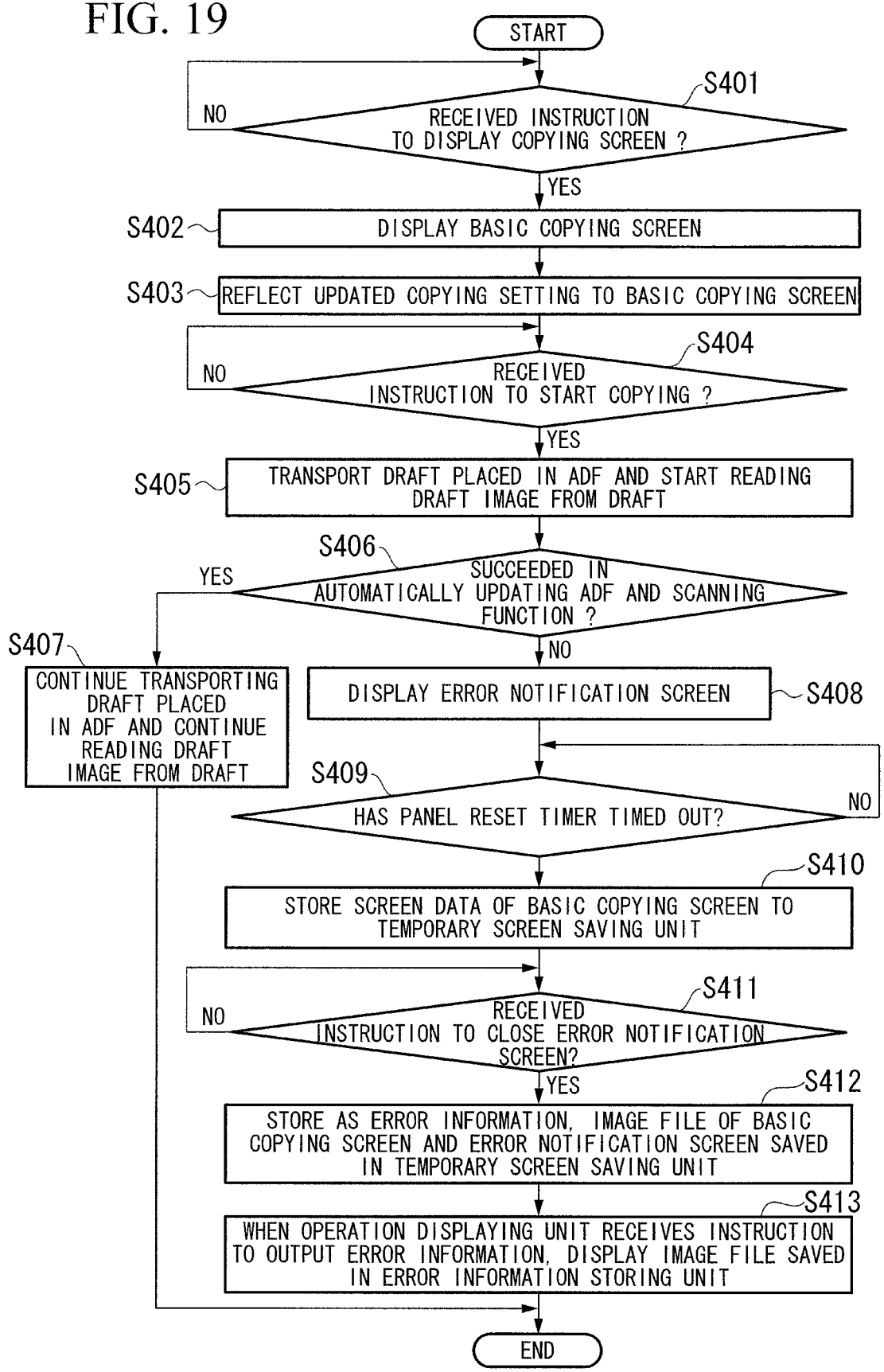
FIG. 19 is a flowchart showing an operation of the multifunction peripheral A400 according to the above embodiment of the present invention.

Next, the operations of the multifunction peripheral A400 according to the above embodiment of the present invention are described in detail with reference to FIG. 19.

First, a user trying to copy a draft with the multifunction peripheral A400 places the draft to the ADF of the image reading unit 406.

Next, the CPU 401 determines whether or not the operation display unit 410 has received instructions to display the copying screen by the pressing of the copying screen displaying key (step S401). If the result of step S401 is NO, the operation display unit 410 has not received instructions to display the copying screen. In this case, the CPU 401 waits until the operation display unit 410 receives instructions to display the copying screen. If the result of step S401 is YES, the operation display unit 410 has received instructions to display the copying screen. In this case, the CPU 401 displays the basic copying screen to the touch panel 410a (step S402).

Figure 20:
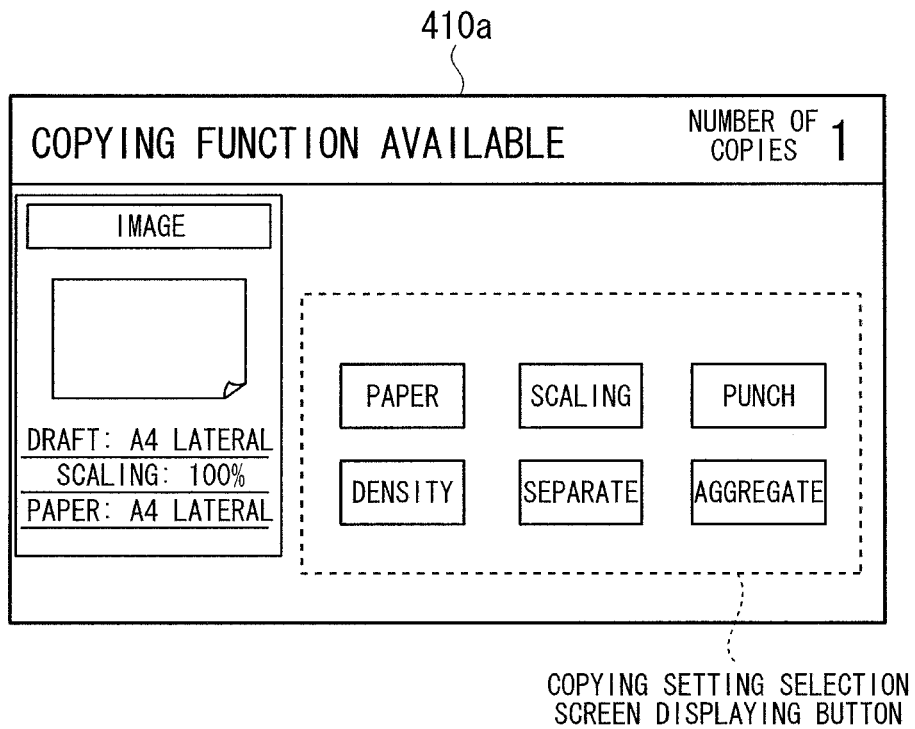
FIG. 20 is a diagram showing a basic copying screen of the multifunction peripheral A400 according to the above embodiment of the present invention.
Figure 21:
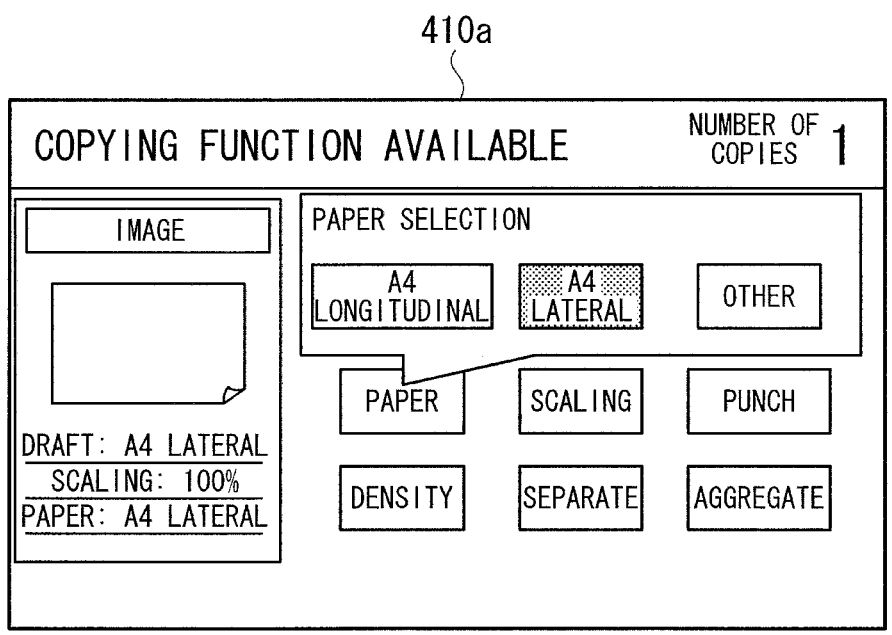
FIG. 21 is a diagram showing a paper selection screen of the multifunction peripheral A400 according to the above embodiment of the present invention.
Figure 22:
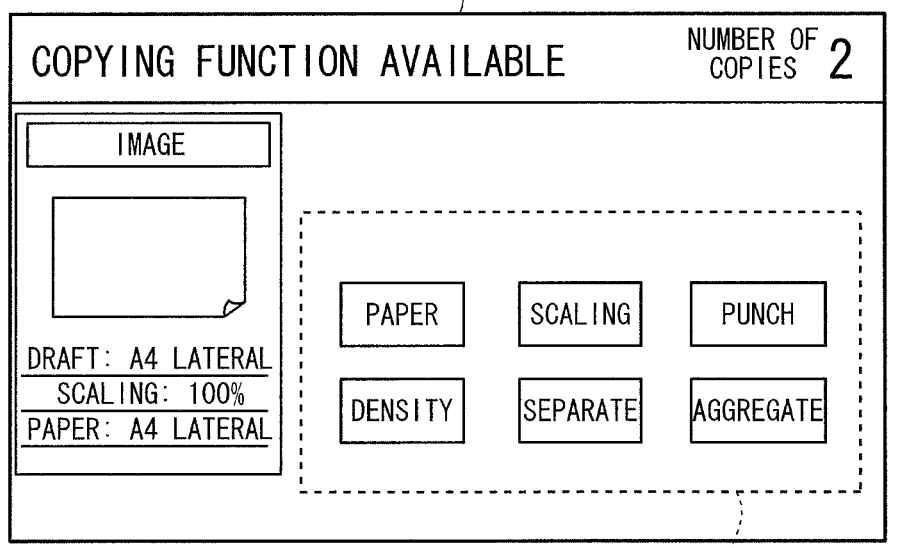
FIG. 22 is a diagram showing an example of the basic copying screen when there is a change in a copying setting of the multifunction peripheral A400 according to the above embodiment of the present invention.

FIG. 20 presents a basic copying screen shown on the touch panel 410a of the multifunction peripheral A400 according to the above embodiment of the present invention. The basic copying screen is the main screen concerning the copying function of the multifunction peripheral A400. As shown in FIG. 20, the current copying settings are displayed in the left side of the basic copying screen. At the same time, a button used to display the screen for selecting the various copying settings (hereinafter may be referred to as the "copying setting selection screen displaying button") is shown on the basic copying screen. For example, a "Paper" button is one of the copying setting selection screen displaying buttons. When the "Paper" button is pressed, a paper selection screen as shown in FIG. 21 is displayed on the touch panel 410a under the control of the CPU 401.

The paper selection screen makes the user select the settings of the printing paper used for copying, such as the size of the printing paper and the direction in which the printing will be performed. According to the paper selection screen presented in FIG. 21, the "A4 Lateral" button is inverted, indicating that the size of the printing paper is A4, and that the printing is performed in the lateral direction of the printing paper. This shows that "A4 Lateral" is chosen as the default printing setting.

After step S402, when the copying setting is changed by a settings-selection screen of various copying settings, the CPU 401 reflects the change of the copying setting on the basic copying screen (step S403). The basic copying screen shown in FIG. 22 indicates that, in step S403, the "number of copies" was changed from one to two, and the "magnitude" was changed from 100% to 90%.

After step S403, the CPU 401 determines whether or not the operation display unit 410 received instructions to start the copying process by the pressing of the start key (step S404). If the result of step S404 is NO, the operation display unit 410 has not received instructions to start the copying process. In this case, the CPU 401 waits until the operation display unit 410 receives instructions to start the copying process. If the result of step S404 is YES, the operation display unit 410 has received instructions to start the copying process. In this case, the CPU 401 makes the image reading unit 406 transport the draft placed in the ADF. At the same time, the reading of the draft image from the draft starts under the command of the CPU 401 (step S405).

After the CPU 401 makes the image reading unit 406 initiate the reading of the draft image from the draft in step S405, the CPU 401 makes the image reading unit 406 automatically adjust the ADF and the scanning function. Then, the CPU 401 determines whether or not the image reading unit 406 succeeded in automatically adjusting the ADF and the scanning function (step S406). If the result of step S406 is YES, the image reading unit 406 has succeeded in automatically adjusting the ADF and the scanning function. In this case, the CPU 401 makes the image reading unit 406 continue transporting the draft placed in the ADF and also continue reading the draft image from the draft (step S407).

Figure 23:
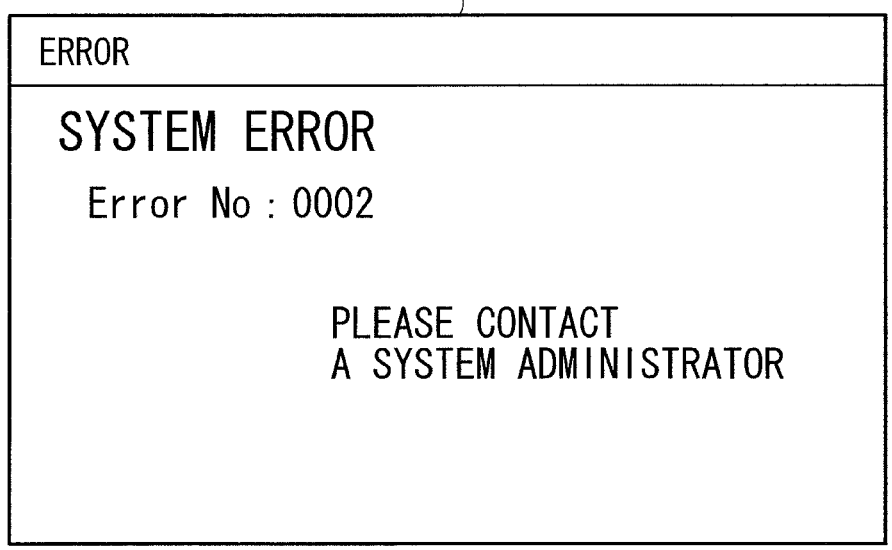
FIG. 23 is a diagram showing an error notification screen of the multifunction peripheral A400 according to the above embodiment of the present invention.

When the CPU 401 determines that the result of step S406 is NO, the image reading unit 406 has not succeeded in automatically adjusting the ADF or the scanning function. In this case, the CPU 401 displays the error notification screen on the touch panel 410a (step S408). The error notification screen, as shown in FIG. 23, indicates that the image reading unit 406 has failed to automatically adjust the ADF or the scanning function. The error notification screen shows an error number indicating the type of error that occurred.

After step S408, the CPU 401 determines whether or not a panel reset timer has timed out (step S409). A panel resetting is a process that resets the copying setting reflected in the basic copying screen. In other words, the copying setting is reset to tie default value during panel resetting. When the multifunction peripheral A400 is not manipulated after the copying operation of the multifunction peripheral ends or is canceled, the CPU 401 launches the panel reset timer. When the panel reset timer measures a certain period of time and times out, the CPU 401 performs the panel resetting process.

If the CPU 401 determines that the result of step S409 is NO, the panel reset timer has not timed out. In this case, the CPU 401 waits until the panel reset timer times out. If the CPU 401 determines that the result of step S409 is YES, the panel reset timer has timed out. In this case, before the CPU 401 performs the panel resetting process, the CPU 401 makes the temporary screen saving unit 412 store the screen data of the basic copying screen shown in FIG. 22, which reflects the copying setting according to step S403 (step S410). Then, the CPU 401 performs the panel resetting process. Normally, concerning the multifunction peripheral A400, even though the touch panel 410a displays the error notification screen, the screen data of the basic copying screen reflecting the copying setting according to step S403 is stored in the RAM 403. In step S410, the CPU 401 makes tie temporary screen saving unit 412 save the screen data of the basic copying screen stored in the RAM 403.

After step S410, the CPU 401 determines whether or not the operation display unit 410 received instructions to close the error notification screen (step S411). If the CPU 401 determines that the result of step S411 is NO, the operation display unit 410 has not received instructions to close the error notification screen (step S410). In this case, the CPU 401 waits until the operation display unit 410 receives instructions to close the error notification screen. If the CPU 401 determines that the result of step S411 is YES, the operation display unit 410 has received instructions to close the error notification screen. In this case, the CPU 401 converts into an image file such as JPE or GIF, the screen data of the basic copying screen saved in the temporary screen saving unit 412 and the screen data of the error notification screen shown on the touch panel 410a. Then, the CPU 401 makes the error information storing unit 411 store the image files of the basic copying screen and the error notification screen (step S412). The CPU 401 then closes the error notification screen.

The CPU 401 stores into the error information storing unit 411, the screen data of the screen currently displayed on the touch panel 410a, in other words the screen data of the error notification screen, separately from the screen data stored by the temporary screen saving unit 412, in other words the screen data of the basic copying screen. For example, in order to separate the screen data of the screen being displayed on the touch panel 410a from the screen data saved in the temporary screen saving unit 412, the CPU 401 adds an identifier when making the error information storing unit 411 store data.

When the operation display unit 410 receives instructions to output the error information by the manipulation of a key, the CPU 401 creates separate titles for the screen stored in the temporary screen saving unit 412 and the screen displayed on the touch panel 410a, so that the two screens can be distinguished. Then, the CPU 401 displays the image files of the basic copying screen stored in the error information storing unit 411 and the error notification screen on the touch panel 410a (step S413).

As described above, based on the multifunction peripheral A400 according to the above embodiment, when the panel reset timer times out, the CPU 401 makes the temporary screen saving unit 412 store the screen data of the basic copying screen reflecting the updated copying setting, before the CPU 401 performs the panel resetting process. Then, when the error notification screen closes, the CPU 401 converts into an image file, the screen data of the basic copying screen saved in the temporary screen saving unit 412 and the screen data of the error notification screen shown on the touch panel 410a. Further, the CPU 401 makes the error information storing unit 411 store this screen file as error information.

In this way, by saving the basic copying screen as error information before the copying setting is updated, the personnel in charge of analyzing the abnormality can accurately comprehend the copying setting of the copying operation at the time the error occurred. As a result, the personnel can identify the cause of the error more effectively.

Heretofore, the fifth embodiment of the present invention was described. However, the present invention is not limited by the above embodiment. For example, the following modification can be made.

The above embodiment concerned applying the electronic device according to an aspect of the present invention to a multifunction peripheral which is a type of an image forming device. However, the electronic device according to an aspect of the present invention can also be applied to other, various kinds of electronic devices such as a personal computer, and a handheld device, as long as the electronic device has a function that displays a screen.

Based on the above embodiment, the CPU 401 converts into an image file, the screen data of the basic copying screen saved in the temporary screen saving unit 412 and the screen data of the error notification screen shown on the touch panel 410*a*. Then, the CPU 401 makes the error information storing unit 411 store the image files as error information. However, the present invention is not limited to the above embodiment.

If the contents displayed on a screen such as the error notification screen is always constant, the information concerning the screen can be saved not as an image file, but instead as an identifier corresponding to the screen (for example, a screen ID) as error information in the error information storing unit 411. By storing the identifier of the screen to the error information storing unit 411, it is possible to maintain enough space in the error information storing unit 411, compared to the case where an image file of the screen data is stored.

Hereunder, a sixth embodiment of the present invention is described with reference to FIGS. 24, 25, 26, 27, and 28. The above embodiment concerns a multifunction peripheral equipped with a copying feature, a printing feature, and a facsimile sending/receiving feature, the multifunction peripheral being a type of an image forming device.

The electronic device according to an aspect of the present invention includes: a memory unit in which a plurality of error information is stored; and a CPU 501 selecting from among the plurality of error information, an error information such that at least one of a type and a frequency of the error that occurred satisfies/satisfy a predetermined condition, the control unit also making the memory unit save the error information.

Figure 24:
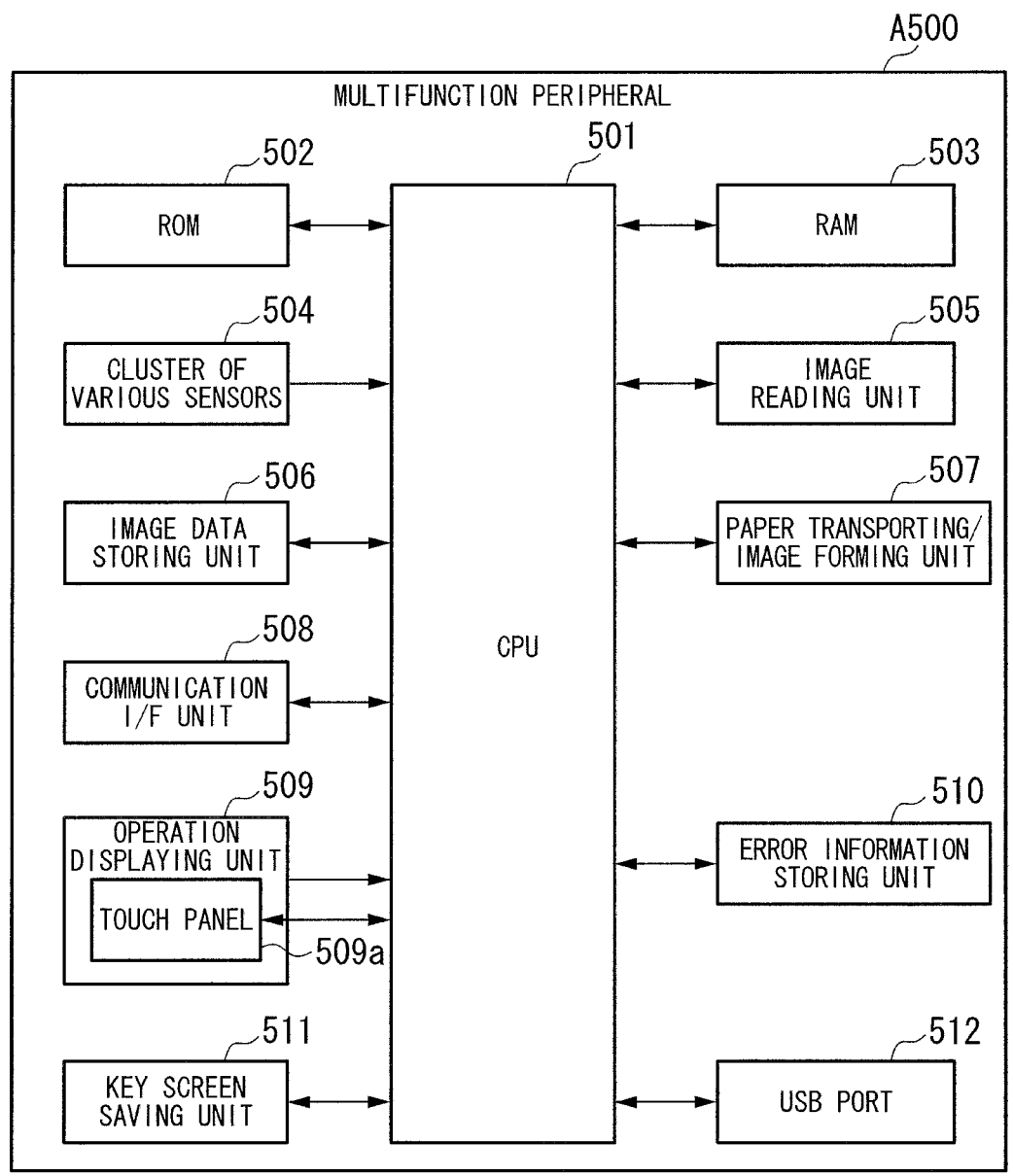
FIG. 24 is a functional block diagram of a multifunction peripheral A500 according to a sixth embodiment of the present invention.

First, the functions and configurations of a multifunction peripheral A500 are described with reference to FIG. 24. The multifunction peripheral A500 includes the CPU (Central Processing Unit) 501, a ROM (Read Only Memory) 502, a RAM (Random Access Memory) 503, a cluster of various sensors 504, an image reading unit 505, an image data storing unit 506, a paper transporting/image forming unit 507, a communication I/F unit 508, an operation display unit 509, an error information storing unit 510, a key screen saving unit 511, and a USB port 512.

The CPU 501 controls the overall operations of the multifunction peripheral A500 based on a control program stored in the ROM 502, various signals detected from the cluster of various sensors 504, draft image data stored in the image data storing unit 506, image data from a printer or a facsimile, various instructions inputted via the communication I/F unit 508 from a client computer (not diagramed) or a public network (not diagramed), and instructions inputted from the operation display unit 509. The details of the control processing performed by the CPU 501 will be described below as an explanation of the operation of the multifunction peripheral A500.

The ROM 502 is a nonvolatile memory that stores the control program executed by the CPU 501 and other data.

The RAM 503 is a volatile memory used as a working area in which data is temporarily stored when the CPU 501 performs various operations by executing the control program.

The cluster of various sensors 504 includes multiple sensors that are necessary for forming images, such as a printing paper outage detecting sensor, a printing paper jam detecting sensor, a printing paper position detection sensor, and a temperature sensor. The cluster of various sensors 504 outputs the various detected information to the CPU 501 as a detection signal.

The image reading unit 505 includes, for example, an ADF (Automatic Draft Feeding Device), a CCD (Charge Coupled Device) sensor and the like. The image reading unit 505 makes the CCD sensor read the image of the draft supplied by the ADF. Then, the image reading unit 505 outputs the draft image data based on the draft image. The image reading unit 505 outputs the draft image data to the CPU 501. Meanwhile, the CPU 501 stores the draft image data to the image data storing unit 506.

Examples of the image data storing unit 506 include flash memory or hard disc. Under the command of the CPU 501, the image data storing unit 506 stores the draft image data, the print image data received by the communication I/F unit 508 from the client computer (not diagramed), and the facsimile image data received by the communication I/F unit 508 from the public network (not diagramed).

The paper transporting/image forming unit 507 includes a print engine. The print engine is a machine that carries out the physical procedure of forming an image, and includes, for example, a paper feed roller, a motor for operating the paper feed roller, a photoconductor drum, an electrostatically charging apparatus, a developing apparatus, a fixing roller, a paper discharging roller, and a motor for operating a transporting roller. Under the command of the CPU 501, the paper transporting/image forming unit 507 transports the printing paper from a paper tray (not diagramed) to the photoconductor drum using the paper feed roller. Based on the draft image data stored in the image data storing unit 506, the print image data, or the facsimile image data, the paper transporting/image forming unit 507 transcribes the image, formed by the toner on the photoconductor drum, onto the printing paper. In addition, the paper transporting/image forming unit 507 performs the fixing process of the image by using a fixing roller. Then, the paper transporting/image forming unit 507 transports the printing paper, used to complete the fixing process, to the paper discharging tray (not diagramed) using the paper discharging roller.

The communication I/F unit 508 connects to an external client computer and a public network. The communication I/F unit 508 transmits and receives various signals between the client computer and the public network.

The operation display unit 509 includes a copying screen displaying key, a printing screen displaying key, a scanning screen displaying key, a facsimile screen displaying key, a document box key, a start key, a stop/clear key, a power source key, a numeric keypad (a number entering key), a touch panel 509*a*, and other various operational keys. The operation display unit 509 outputs the operational instructions for each key to the CPU 501. Further, under the command of the CPU 501, the operation display unit 509 displays various screens on the touch panel 509*a*.

The copying function switching key, the printing function switching key, the scanning function switching key, and the facsimile function switching key are used to switch the multifunction peripheral A500 to a mode that performs each function when the user uses the function. The document box key is used to launch the document box function which enables the user to utilize the draft image data that was previously read by the image reading unit 505 and stored in a document box/folder (not diagramed) of the hard disc.

A flash memory and a hard disc are examples of the error information storing unit 510. When various errors occur with respect to the multifunction peripheral A500, the error information storing unit 510 stores various error information under the control of the CPU 501. The personnel in charge of analyzing the abnormality uses this error information when he or she analyzes the error.

The key screen saving unit 511 is a volatile memory that temporarily saves data. Under the control of the CPU 501, the key screen saving unit 511 saves the key screen displayed on the touch panel 509*a*. The key screen is specified in advance from all of the screens. The CPU 501 makes the key screen saving unit 511 save the key screen displayed on the touch panel 509*a* according to the operation of the multifunction peripheral A500. When the CPU 501 makes the key screen saving unit 511 save the key screen, the CPU 501 also saves the time at which the key screen was saved.

The USB port 512 is a serial interface in compliance with the USB standard. When a USB memory (not diagramed) is placed on the USB port 512, the USB port 512 electrically connects with the USB memory. When this USB port 512 is connected to the USB memory, the USB port 512 inputs an electronic file from the USB memory and outputs an electronic file to the USB memory.

Next, the operations of the multifunction peripheral A500 according to the above embodiment of the present invention are described.

When an error occurs with respect to the multifunction peripheral A500, the CPU 501 determines, according to the type of the error that occurred, the number of key screens to be stored as error information. The CPU 501 makes this determination based on a control program saved in the ROM 502. Then, the CPU 501 stores the determined number of key screens as error information.

A "print engine abnormality" with an error code of "0001" is an error with substantial significance relating to the printing feature. Therefore, when the "print engine abnormality" occurs, the CPU saves as error information, the five most recent key screens from among the key screens saved in the key screen storing unit 511. A "document box breakage" with an error code of "0002" relates to the document box feature involving complex manipulations by the user. Therefore, when the "document box breakage" occurs, the CPU 501 saves as error information, all of the key screens that the key screen saving unit 511 saved after the document box key was pressed.

Furthermore, when a "launching abnormality" with an error code of "0003" occurs, the CPU 501 saves as error information, the screen at the time the "launching abnormality" occurred, because there are not previous key screens saved. A "facsimile abnormality" with an error code of "0004" relates only to the transmitting operation of the facsimile. Therefore, when the "facsimile abnormality" occurs, the CPU 501 saves as error information, the three most recent key screens from among the key screens saved in the key screen saving unit 511.

Figure 25:
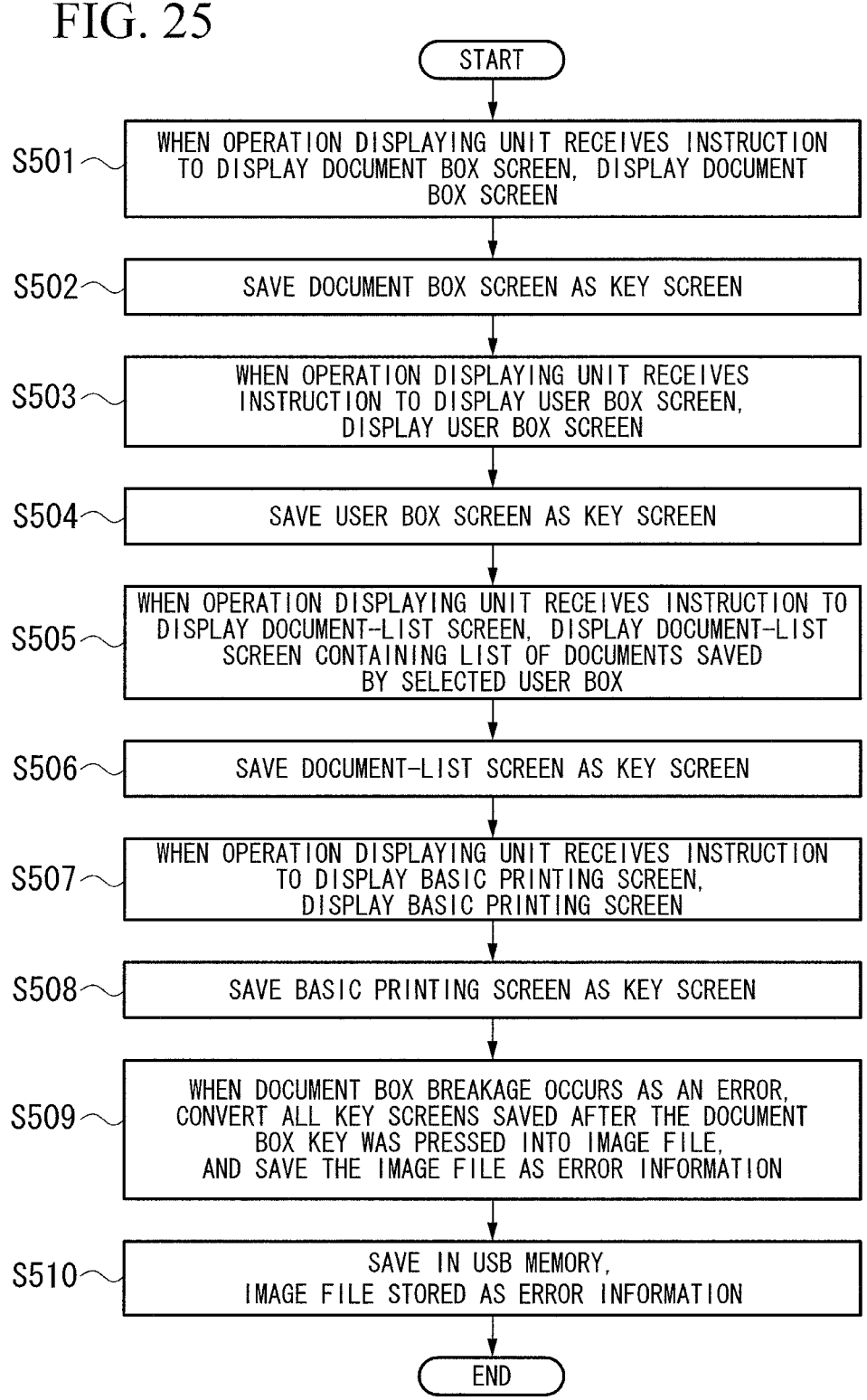
FIG. 25 is a flowchart showing an operation performed when a document box of the multifunction peripheral A500 according to the above embodiment of the present invention breaks.
Figure 26:
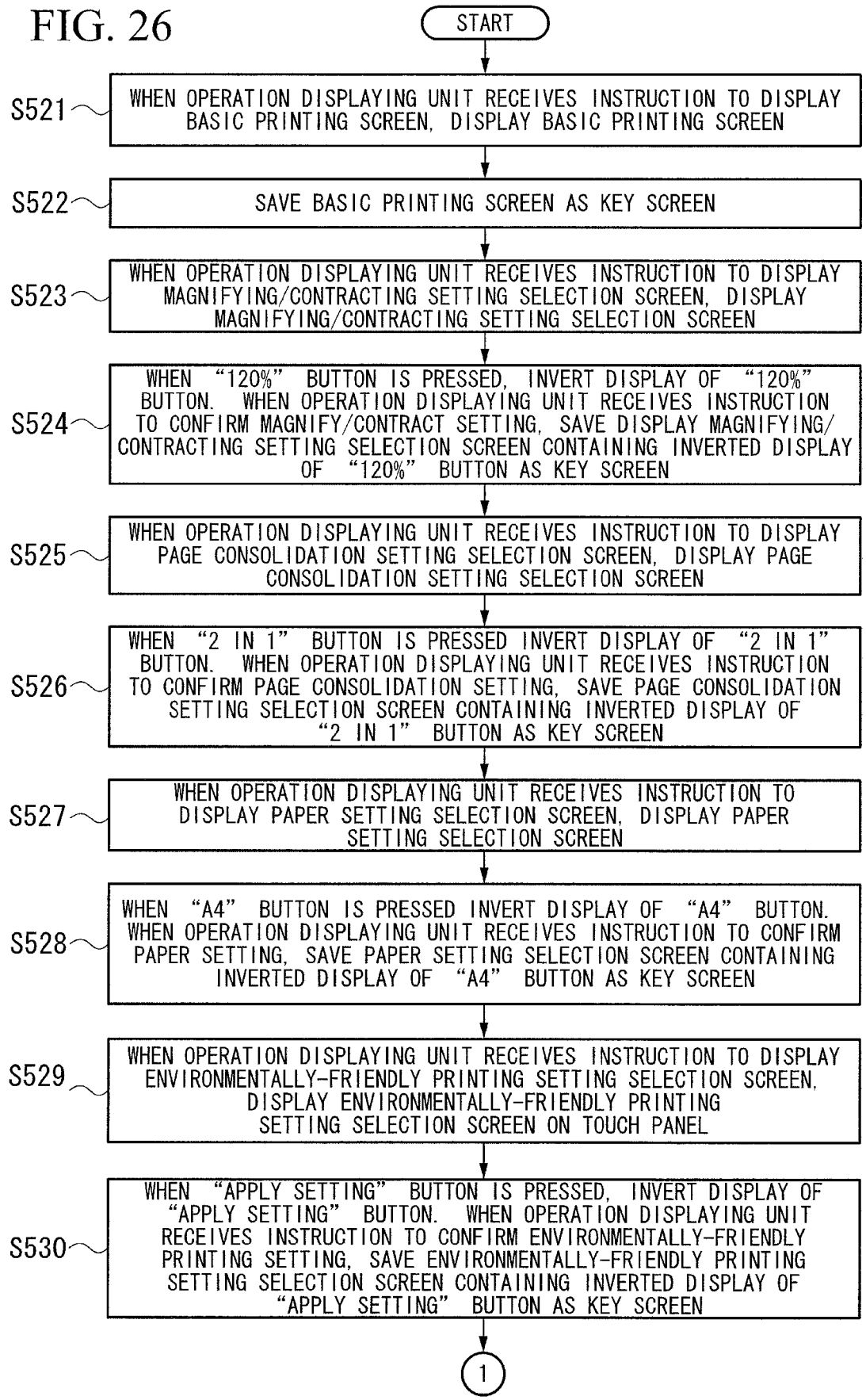
FIG. 26 is a flowchart showing an operation performed when an abnormality of a print engine of the multifunction peripheral A500 according to the above embodiment of the present invention occurs.
Figure 27:
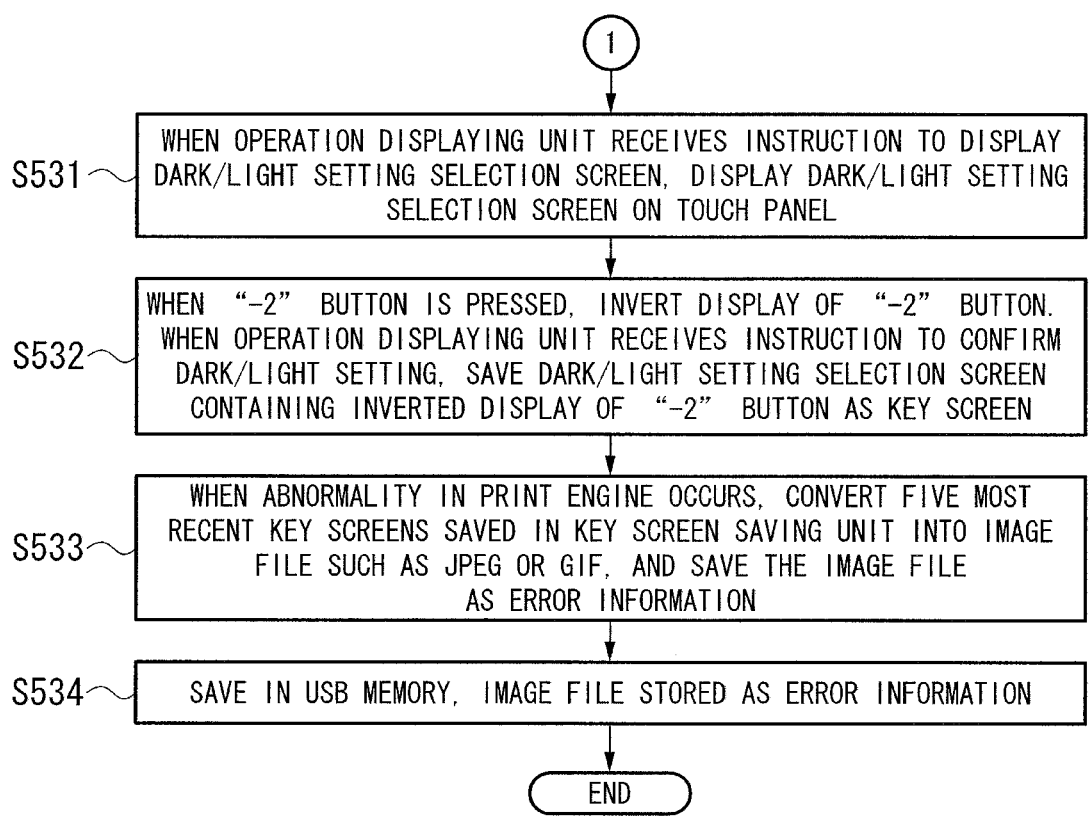
FIG. 27 is a flowchart (continued from FIG. 26) showing an operation performed when an abnormality of a print engine of the multifunction peripheral A500 according to the above embodiment of the present invention occurs.

With reference to FIGS. 25, 26, and 27, the operation of the multifunction peripheral A500 is described in more detail when the "print engine abnormality" (error code "0001") and the "document box breakage" (error code "0002") occur.

First, with reference to FIG. 25, the operation of the multifunction peripheral A500 is described when the "document box breakage" (error code "0002") occurs.

When the operation display unit 509 receives instructions to display the document box screen by the pressing of the document box key of the operation display unit 509, the CPU 501 displays the document box screen to the touch panel 509*a* (step S501). Next, the CPU 501 makes the key screen saving unit 511 save this document box screen as a key screen (step S502).

Figure 28:
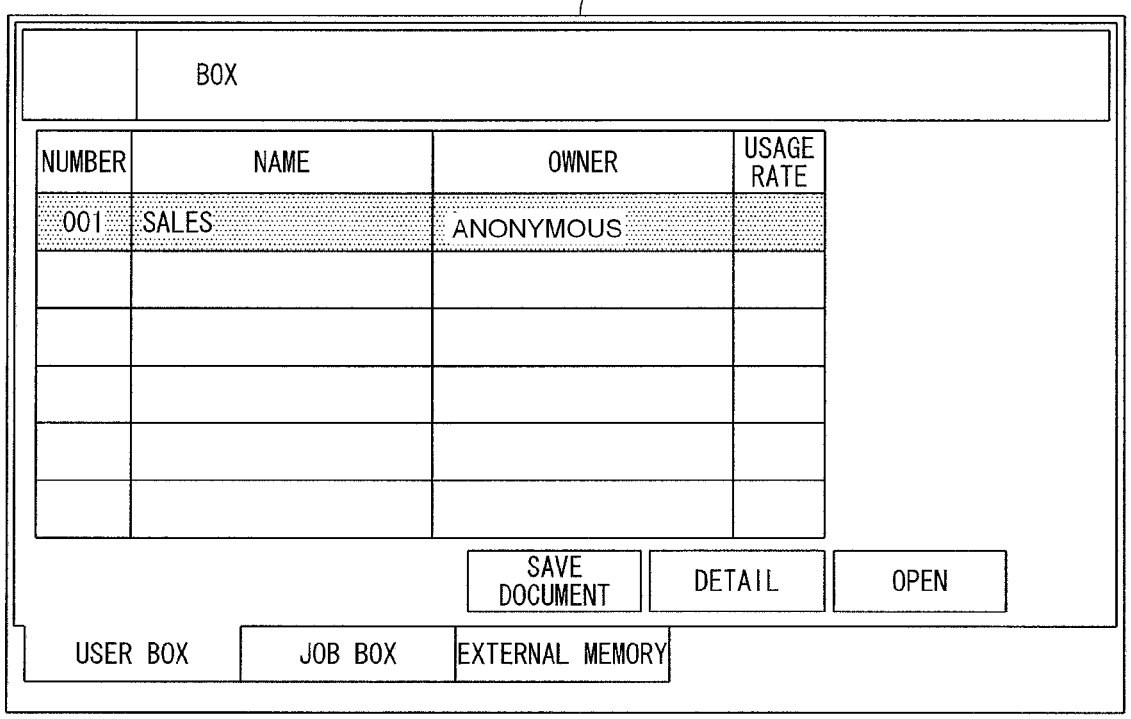
FIG. 28 is a diagram showing a document box screen of the multifunction peripheral A500 according to the above embodiment of the present invention.

After step S502, when the operation display unit 509 receives instructions to display a user box screen by the pressing of the user box tab of the document box screen, the CPU 501 displays the user box screen on the touch panel 509*a* (step S503). Next, the CPU 501 makes the key screen saving unit 511 save this user box screen as a key screen (step S504). In step S501, when the user box screen is already being displayed as shown in FIG. 28 when the document box screen is displayed, the contents being displayed is not updated in step S503.

After step S504, when a certain user box is selected from among the various user boxes displayed on the user box screen, and the operation display unit 509 receives instructions to display a document-list screen by the pressing of the "Open" button on the user box screen, the CPU 501 displays the document-list screen on the touch panel 509*a* (step S505). In step S505, a list of documents saved in the selected user box is shown on the document-list screen. Next, the CPU 501 makes the key screen saving unit 511 save this document-list screen as a key screen (step S506).

After step S506, when a certain document is selected from among the various documents displayed on the document-list screen, and the operation display unit 509 receives instructions to display the basic printing screen by the pressing of the "Print" button displayed on the document-list screen, the CPU 501 displays the basic printing screen on the touch panel 509*a* (step S507). Next, the CPU 501 makes the key screen saving unit 511 save this basic printing screen as a key screen (step S508). The basic printing screen shows a button (hereinafter may be referred to as the "copying setting selection screen displaying button") used to display a copying setting selection screen. The user uses this copying setting selection screen to choose the setting-values for the copying setting to print the selected document.

After step S508, when the "document box breakage" occurs while the touch panel 509*a* is displaying the basic printing screen, the CPU 501 converts to an image file such as JPEG or GIF, all of the key screens saved in the key screen saving unit 511 after the document box key was pressed. In other words, the CPU 501 converts to an image file such as JPEG or GIF, screen data concerning the document box screen, the user box screen, the document-list screen, and the basic printing screen. Then, the CPU 501 makes the error information storing unit 510 store these image files as error information (step S509).

After step S509, when the operation display unit 509 receives instructions to output the error information by a manipulation of a key, the CPU 501 saves into the USB memory connected to the USB port 512, the image file stored by the error information storing unit as error information (step S510).

Next, with reference to FIGS. 26 and 27, the operation of the multifunction peripheral A500 is described when the "print engine abnormality" (error code "0001") occurs.

After step S506, when a certain document is selected from among the various documents displayed on the document-list screen, and the operation display unit 509 receives instructions to display the basic printing screen by the pressing of the "Print" button displayed on the document-list screen, the CPU 501 displays the basic printing screen on the touch panel 509*a* (step S521). Next, the CPU 501 makes the key screen saving unit 511 save this basic printing screen as a key screen (step S522).

When the operation display unit 509 receives instructions to display a screen for selecting the magnifying/contracting setting (hereinafter may be referred to as the "magnifying/contracting setting selection screen") by the pressing of the "Magnifying/Contracting" button on the basic print screen, the CPU 501 displays the magnifying/contracting setting selection screen on the touch panel 509a (step S523). When the "120%" button is pressed, the CPU 501 inverts the display of the "120%" button. When the operation display unit 509 receives instructions to set the magnifying and contracting ratio by the pressing of the "OK" button, the CPU 501 makes the key screen saving unit 511 save the magnifying/contracting setting selection screen as a key screen (step S524). The "120%" button is inverted in the magni ing/contracting setting selection screen saved in step S524. Then, the CPU 501 displays the basic printing screen to the touch panel 509a.

When the operation display unit 509 receives instructions to display a screen for selecting the setting for consolidating multiple pages (hereinafter may be referred to as a "page consolidation setting selection screen") by the pressing of the "Page Consolidation" button, the CPU 501 displays the page consolidation setting selection screen on the touch panel 509a (step S525). When the "2 in 1" button is pressed, the CPU 501 inverts the display of the "2 in 1" button. When the operation display unit 509 receives instructions to consolidate multiple pages by the pressing of the "OK" button, the CPU 501 makes the key screen saving unit 511 save the page consolidation setting selection screen as a key screen (step S526). The "2 in 1" button is inverted in the page consolidation setting selection screen saved in step S526. Then, the CPU 501 displays the basic printing screen on the touch panel 509a.

When the operation display unit 509 receives instructions to display a screen for selecting the setting for the printing paper (hereinafter may be referred to as a "paper setting selection screen") by the pressing of the "Paper Selection" button, the CPU 501 displays the paper setting selection screen on the touch panel 509a (step S527). When the "A4" button is pressed, the CPU 501 inverts the display of the "A4" button. When the operation display unit 509 receives instructions to confirm the setting of the printing paper by the pressing of the "OK" button, the CPU 501 makes the key saving unit 511 save the paper setting selection screen as a key screen (step S528). The "A4" button is inverted in the paper setting selection screen saved in step S528. Then, the CPU 501 displays the basic printing screen on the touch panel 509a.

When the operation display unit 509 receives instructions to display a screen for selecting the setting for environmentally-friendly printing (hereinafter may be referred to as an "environmentally-friendly printing setting selection screen") by the pressing of the "Environmentally-Friendly Printing" button, the CPU 501 displays the environmentally-friendly printing setting selection screen on the touch panel 509a (step S529). When the "Apply Setting" button is pressed, the CPU inverts the display of the "Apply Setting" button. When the operation display unit 509 receives instructions to apply the setting for environmentally-friendly printing by the pressing of the "OK" button, the CPU 501 makes the key screen saving unit 511 save the environmentally-friendly printing setting selection screen as a key screen (step S530). The "Apply Setting" button is inverted in the environmentally-friendly printing setting selection screen saved in step S530. Then, the CPU 501 displays the basic printing screen on the touch panel 509a.

When the operation display unit 509 receives instructions to display a screen for selecting the dark/light setting of the printing (hereinafter may be referred to as a "dark/light setting selection screen") by the pressing of the "Adjust Dark/Light Setting" button, the CPU 501 displays the dark/light setting selection screen on the touch panel 509a (step S531). When the "−2" button is pressed, the CPU 501 inverts the display of the "−2" button. When the operation display unit 509 receives instructions to adjust the dark/light setting by the pressing of the "OK" button, the CPU 501 makes the key screen saving unit 511 save the dark/light setting selection screen as a key screen (step S532). The "−2" button is inverted in the dark/light setting selection screen saved in step S532. Then, the CPU 501 displays the basic printing screen on the touch panel 509a.

After step S532, when the operation display unit 509 receives instructions to start the printing process by the pressing of the start key, the CPU 501 makes the paper transporting/image forming unit 507 start the image forming process. When a "print engine abnormality" occurs while the paper transporting/image forming unit 507 is performing the image forming process, the CPU 501 converts into an image file such as JPEG or GIF, the five most recent key screens saved in the key screen saving unit 511. In other words, the CPU 501 converts the screen data of the magnifying/contracting setting selection screen, the page consolidation setting selection screen, the paper setting selection screen, the environmentally-friendly printing setting selection screen, and the dark/light setting selection screen into an image file such as JPEG or GIF. Then, the CPU 501 makes the error information storing unit 510 store the image file as error information (step S533).

After step S533, when the operation display unit 509 receives instructions to output the error information by the manipulation of a key, the CPU 501 stores into the USB memory connected with the USB port 512, the image file stored in the error information storing unit 510 as error information (step S544).

As described above, based on the multifunction peripheral A500 according to the above embodiment, when an error occurs, the CPU 501 determines the number of key screens that will be saved as error information according to the type of error that occurred. The converts the screen data of the key screen, saved by the key screen saving unit 511, into an image file, starting from the most recent key screen until the screen data of the determined number of key screens are converted. Further, the CPU 501 makes the error information storing unit 510 store the image file as error information.

Thus, based on the multifunction peripheral A500 according to the above embodiment, when an error occurs, one or more of the key screens that were saved before the error occurred are stored as error information. The number of key screens that will be stored as error information depends on the type of the error. As a result, the personnel in charge of analyzing the abnormality can accurately comprehend the operation of the multifunction peripheral A500 and the series of manipulations made by the user before the error occurred. Consequently, the personnel can analyze the cause of the error more efficiently.

Heretofore, the sixth embodiment of the present invention was described. However, the present invention is not limited by the above embodiment. For example, the following modification can be made.

The above embodiment concerned applying the electronic device according to an aspect of the present invention to a multifunction peripheral which is a type of an image forming device. However, the electronic device according to an aspect of the present invention can also be applied to other, various kinds of electronic devices such as a personal computer and a handheld device, as long as the electronic device has a function that displays a screen.

Based on the above embodiment, the number of key screens, determined by the CPU 501 according to the type of error that occurred, which will be saved as error information is already set in advance. However, the present invention is not limited by the above embodiment.

For example, when the operation display unit 509 receives instructions to set the number of key screens that will be saved as error information according to the type of error that occurred, the CPU 501 may store information on the number of key screens that will be saved as error information according to the type of error that occurred (hereinafter may be referred to as "key screen number information"). In addition, when an error occurs, the CPU 501 may determine the number of key screens that will be saved as error information based on the above key screen number information.

Based on the above embodiment, when the "document box breakage" or the "print engine abnormality" occurred, the CPU 501 made the error information storing unit 510 store only the key screens saved by the key screen saving unit 511 as error information. However, the present invention is not limited by the above embodiment.

For example, when an error occurs, the CPU 501 can convert the screen data of the screen being displayed on the touch panel 509*a* at the time the error occurred, into an image file. The CPU 501 can also make the error information storing unit 510 store the screen file of the screen being displayed on the touch panel 509*a*, along with the screen file of the key screen as error information.

Further, when the CPU 501 displays an error notification screen, indicating the occurrence of the error and the type of the error, on the touch panel 509*a* after the error occurred, the CPU 501 may convert the screen data of this error notification screen into an image file. The image file of the error notification screen can also be saved in the error information storing unit 510 as error information.

In addition, if the contents displayed on a screen such as the error notification screen is constant, the information concerning the screen can be saved not as an image file, but instead as an identifier corresponding to the screen (for example, a screen ID) as error information in tie error information storing unit 510. By storing the identifier of the screen to the error information storing unit 510, it is possible to maintain enough space in the error information storing unit 510, compared to the case where an image file of the screen data is stored.

Based on the above embodiment, when the operation display unit 509 receives instructions to output error information, the CPU 501 saves into the USB memory connected with the USB port 512, the error information stored in the error information storing unit 510. However, the present invention is not limited to the above embodiment.

For example, the CPU 501 may output the error information stored in the error information storing unit 510 to a personal computer based on instructions from the personal computer (not diagramed) connected to the communication I/F unit 508 of the multifunction peripheral A500 to output error information. In addition, the personnel in charge of analyzing the abnormality may perform the analysis of the error by displaying the error information on a screen of the personal computer. Furthermore, when the operation display unit 509 receives instructions to output error information, the CPU 501 may display on the touch panel 509*a*, the image file stored in the error information storing unit 510 as error information.

A summary of the present invention according to each of the above embodiments is as follows:

Namely, an electronic device according to an aspect of the present invention includes: a memory unit in which a plurality of error information is stored; and a control unit selecting from among the plurality of error information, an error information such that at least one of a type and a frequency of the error that occurred satisfies/satisfy a predetermined condition, the control unit also making the memory unit save the error information.

In addition, the electronic device according to the aspect of the present invention may be configured as follows: the control unit does not fully record the error information to the memory unit when the control unit identifies that the error that occurred is not serious and that this error occurs frequently in a normal setting.

In addition, the electronic device according to the aspect of the present invention may be configured as follows: when an effect of the error that occurred is limited to a specific function, the control unit records only the error information relating to the specific function to the memory unit.

In addition, the electronic device according to the aspect of the present invention may be configured as follows: when the error that occurred has also occurred previously one or more times, the control unit records only a certain information from the error information to the memory unit.

On the other hand, an electronic device according to an aspect of the present invention includes a display unit; a memory unit storing an image displayed on the display unit; a communication unit communicating with an external party; a control unit converting the image displayed on the display unit when an error occurred into a first image file and storing this first image file as a first error information to the memory unit, displaying an error notification screen on the display unit indicating that the error occurred, converting the error notification screen displayed on the display unit into a second image file and storing this second image file as a second error information to the memory unit; and an output control unit outputting the first error information and the second error information according to an instruction from the external party.

In addition, the electronic device according to the aspect of the present invention may be configured as follows: the control unit converts the image displayed on the display unit when the error occurred into the first image file and creates an error notification email, attaching the first image file as the first error information and the second image file as the second error information to the error notification email, and the output control unit outputs the first error information and the second error information to an error notification recipient.

In addition, the electronic device according to the aspect of the present invention may be configured as follows: the control unit determines whether or not to make the communication unit transmit the error notification email to an error notification recipient based on a type of the error that occurred.

On the other hand, an error management system according to an aspect of the present invention includes the above electronic device according to the aspect of the present invention; and a supervisory computer communicating with the electronic device, wherein the control unit of the electronic device makes the communication unit transmit the error notification email to the supervisory computer, the supervisory computer being an error notification recipient.

In addition, the error management system according to the aspect of the present invention may further include: an error information accumulation server communicating with the electronic device and the supervisory computer, wherein the control unit of the electronic device makes the communication unit transmit to the error information accumulation server, an error information storage request including the first error information and the second error information, and an error notification email transmission request requesting that the error notification email be sent to the supervisory computer; and when the error information accumulation server receives the error information storage request and the error notification email transmission request, the error information accumulation server stores the first error information and the second error information included in the error information storage request, and transmits the error notification email including a notation of a storage location of the first error information and the second error information to the supervisory computer.

In addition, the error management system according to the aspect of the present invention may further include: an error information accumulation server communicating with the electronic device and the supervisory computer, wherein the control unit of the electronic device makes the communication unit transmit an error information storage request including the first error information and the second error information to the error information accumulation server; when the error information accumulation server receives the error information storage request, the error information accumulation server stores the first error information and the second error information included in the error information storage request, and transmits an error information storage response including a notation of a storage location of the first error information and the second error information to the electronic device; and when the communication unit receives the error information storage response, the control unit of the electronic device creates the error notification email including the notation of the storage location of the first error information and the second error information, and makes the communication unit transmit this error notification email to the supervisory computer.

In addition, the error management system according to the aspect of the present invention may further include: a plurality of the supervisory computers, wherein the control unit of the electronic device selects the supervisory computer that will be a transmission destination of the error notification email from among the plurality of the supervisory computers based on a type of the error that occurred.

On the other hand, an electronic device according to an aspect of the present invention includes a display unit; a display screen storing unit storing a screen data being a basis of an image displayed on the display unit; a preparation screen storing unit storing the screen data corresponding to an operation performed in a background and the screen data which can be displayed after the image displayed on the display unit; an error information storing unit storing an error information; a memory control unit making the error information storing unit store the screen data saved by the display screen storing unit when an error occurs, and the screen data saved by the preparation screen storing unit, respectively as a first error information; and an output control unit outputting the first error information based on an instruction from an external party.

In addition, the electronic device according to the aspect of the present invention may be configured as follows: after the memory control unit makes the error information storing unit store the first error information, the memory control unit makes the error information storing unit store the screen data of an error notification screen, created by the preparation screen storing unit, as a second error information.

In addition, the electronic device according to the aspect of the present invention may be configured as follows: when the image displayed on the display unit is a fixed display, the memory control unit makes the error information storing unit store an identifier of the fixed display as a third error information.

In addition, the electronic device according to the aspect of the present invention may be configured as follows: the memory control unit makes the error information storing unit store the screen data saved in the display screen storing unit separately from the screen data saved in the preparation screen storing unit, and based on the first error information stored by the error information storing unit, the output control unit displays the screen data saved in the display screen storing unit separately from the screen data saved in the preparation screen storing unit on the display unit.

In addition, the electronic device according to the aspect of the present invention may perform a panel resetting process by resetting a setting value of each of a plurality of setting information images displayed on the display unit to a default value, the electronic device further including: an error information storing unit storing an error information; a temporary screen saving unit temporarily saving the image displayed on the display unit; and a memory control unit making the temporary screen saving unit save the setting information image before the panel resetting process is performed when the error notification screen indicating that the error occurred is displayed on the display unit, the memory control unit also making the error information storing unit store an image data of the setting information image saved by the temporary screen saving unit as a third error information, wherein the output control unit outputs the third error information based on an instruction from an external party.

In addition, the electronic device according to the aspect of the present invention may further include: a display unit displaying a plurality of images; a key screen saving unit saving an image data of a predetermined key screen from among the plurality of images displayed on the display unit; and an output unit outputting the error information saved in the memory unit according to an instruction from an external party, wherein when the error occurs, the control unit determines a number indicating how many of the image data will be saved according to the type of the error, and makes the memory unit save the determined number of image data as a first error information from among the image data saved by the key screen saving unit, the determined number of image data selected reverse-chronologically in order from the image data most recently saved.

In addition, the electronic device according to the aspect of the present invention may be configured as follows: the control unit saves as an image data storage number information, the number indicating how many of the image data will be saved as the first error information according to the type of the error based on the instruction from the external party, and determines the number of image data to be saved as the first error information based on the image data storage number information when the error occurs.

In addition, the electronic device according to the aspect of the present invention may be configured as follows: the control unit makes the memory unit store an image data of the image displayed by the display unit when the error occurred as a second error information along with the first error information, and makes the memory unit store a data concerning an error notification screen indicating that the error occurred as a third error information along with the first error information.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An electronic device comprising:
a display unit;
a memory unit storing an image displayed on the display unit;
a communication unit communicating with an external party;
a control unit automatically converting the image displayed on the display unit at an end of a first minimum time interval after an error occurs into a first image file, and automatically storing the first image file as a first error information to the memory unit, automatically displaying an error notification screen on the display unit indicating that the error occurred, automatically converting the error notification screen displayed on the display unit into a second image file and automatically storing the second image file as a second error information to the memory unit; and
an output control unit outputting the first error information and the second error information according to an instruction from the external party,
wherein the first error information is related to the second error information, and
at an end of a second minimum time interval after an error occurs, the first image file, after the end of the first minimum time interval after the error occurs and before an error notification screen is displayed, is automatically saved as the first error information, the first minimum time interval and the second minimum time interval being functions of a processing speed of the control unit.

2. The electronic device according to claim 1, wherein:
the control unit converts the image displayed on the display unit at the end of the first minimum time interval after the error occurred into the first image file and creates an error notification email, attaching the first image file as the first error information and the second image file as the second error information to the error notification email, and
the output control unit outputs the first error information and the second error information to an error notification recipient.

3. The electronic device according to claim 2, wherein:
the control unit determines whether or not to make the communication unit transmit the error notification email to an error notification recipient based on a type of the error that occurred.

4. An error management system comprising:
the electronic device according to claim 2; and
a supervisory computer communicating with the electronic device, wherein
the control unit of the electronic device makes the communication unit transmit the error notification email to the supervisory computer, the supervisory computer being an error notification recipient.

5. The error management system according to claim 4 further comprising:
an error information accumulation server communicating with the electronic device and the supervisory computer, wherein
the control unit of the electronic device makes the communication unit transmit, to the error information accumulation server, an error information storage request including the first error information and the second error information, and an error notification email transmission request requesting that the error notification email be sent to the supervisory computer; and
when the error information accumulation server receives the error information storage request and the error notification email transmission request, the error information accumulation server stores the first error information and the second error information included in the error information storage request, and transmits the error notification email including a notation of a storage location of the first error information and the second error information to the supervisory computer.

6. The error management system according to claim 4 further comprising:
an error information accumulation server communicating with the electronic device and the supervisory computer, wherein
the control unit of the electronic device makes the communication unit transmit an error information storage request including the first error information and the second error information to the error information accumulation server;
when the error information accumulation server receives the error information storage request, the error information accumulation server stores the first error information and the second error information included in the error information storage request, and transmits an error information storage response including a notation of a storage location of the first error information and the second error information to the electronic device; and
when the communication unit receives the error information storage response, the control unit of the electronic device creates the error notification email including the notation of the storage location of the first error information and the second error information, and makes the communication unit transmit this error notification email to the supervisory computer.

7. The error management system according to claim 4 further comprising:
a plurality of supervisory computers, wherein
the control unit of the electronic device selects a supervisory computer that will be a transmission destination of the error notification email from among the plurality of the supervisory computers based on a type of the error that occurred.

8. An electronic device comprising:
a memory unit; and
a control unit selecting, from among a set of information corresponding to a plurality of errors, selected information corresponding to an error that occurred, such that at least one of a type and a frequency of the error that occurred satisfies a predetermined condition, the control unit also causing the memory unit to store the selected information, the electronic device further comprising:
a display unit displaying a plurality of images;
a key screen saving unit saving a plurality of image data of a predetermined key screen from among the plurality of images displayed on the display unit; and
an output unit outputting the error information saved in the memory unit according to an instruction from an external party, wherein
when the error occurs, the control unit determines a number indicating how many of the plurality of image data will be saved according to a type of the error, and makes the memory unit save the determined number of the plurality of image data as a first error information from among the plurality of image data saved by the key screen saving unit, the determined number of the plurality of image data selected reverse-chronologically in order from the image data most recently saved.

9. The electronic device according to claim 8, wherein:
the control unit saves storage number information as an image data, the storage number information indicating how many of the plurality of image data will be saved as the first error information according to the type of the error based on the instruction from the external party, and determines the number of the plurality of image data to be saved as the first error information based on the storage number information when the error occurs.

10. The electronic device according to claim 8, wherein:
the control unit makes the memory unit store an image data of the image displayed by the display unit when the error occurs as a second error information along with the first error information, and makes the memory unit store a data concerning an error notification screen indicating that the error occurred as a third error information along with the first and the second error information.

* * * * *